(12) United States Patent
Root

(10) Patent No.: US 9,010,318 B2
(45) Date of Patent: Apr. 21, 2015

(54) EXTENDED-RANGE HEAT TRANSFER FLUID USING VARIABLE COMPOSITION

(75) Inventor: Thatcher W. Root, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 1265 days.

(21) Appl. No.: 12/875,420

(22) Filed: Sep. 3, 2010

(65) Prior Publication Data

US 2011/0146959 A1  Jun. 23, 2011

Related U.S. Application Data

(60) Provisional application No. 61/239,883, filed on Sep. 4, 2009.

(51) Int. Cl.
*F03G 6/00*   (2006.01)
*F24J 2/04*   (2006.01)
(Continued)

(52) U.S. Cl.
CPC . *F24J 2/463* (2013.01); *C09K 5/10* (2013.01); *F24J 2/14* (2013.01); *F24J 2/4649* (2013.01); *F28F 23/00* (2013.01); *Y02E 10/40* (2013.01)

(58) Field of Classification Search
CPC ........ F24J 2/4632; F24J 2/4649; F28F 23/00; F28F 23/02; C09K 5/00–5/20
USPC .......... 60/681.8–641.15, 649, 659, 651, 671, 60/646, 657, 641.8–641.15; 165/108, 165/134.1; 126/380.1, 381.1, 588, 636, 126/638, 679; 237/80; 23/295 S; 202/234; 252/67, 68, 71–75; 137/3, 110
See application file for complete search history.

(56) References Cited

U.S. PATENT DOCUMENTS 1,882,809 A * 10/1932 Grebe ............................. 252/67
1,961,784 A *  6/1934 Roe ................................ 60/649
(Continued)

FOREIGN PATENT DOCUMENTS

DE       19953493 A1 *  5/2001
GB       2023280 A  * 12/1979
(Continued)

OTHER PUBLICATIONS

Jasbir Singh, *Heat Transfer Fluids and Systems for Process and Energy Applications*, published by Marcel Dekker, Inc. (1985), pp. 223-240.
(Continued)

*Primary Examiner* — Thomas Denion
*Assistant Examiner* — Laert Dounis
(74) *Attorney, Agent, or Firm* — Lathrop & Gage LLP

(57) ABSTRACT

The present invention provides systems and methods for transferring heat using a variable composition organic heat transfer fluid that remains liquid over a wide operating temperature range useful for solar heating applications. Variable composition heat transfer fluids of the present invention comprise a miscible mixture, optionally a completely miscible mixture, of a high boiling point component selected for its beneficial high temperature physical properties, and a low freezing point component selected for its beneficial low temperature physical properties. In some embodiments, the low freezing point component is removed from the heat transfer fluid as the heat transfer fluid is heated, for example by being removed in the vapor phase, thereby selectively varying the composition and physical properties (e.g., vapor pressure, boiling point, etc.) of the heat transfer fluid as a function of temperature.

50 Claims, 7 Drawing Sheets

(51) Int. Cl.

| | |
|---|---|
| *F24J 2/40* | (2006.01) |
| *F01K 13/02* | (2006.01) |
| *F24J 2/46* | (2006.01) |
| *C09K 5/10* | (2006.01) |
| *F28F 23/00* | (2006.01) |
| *F24J 2/14* | (2006.01) |

(56) References Cited

U.S. PATENT DOCUMENTS

| | | | | |
|---|---|---|---|---|
| 1,982,745 | A | * 12/1934 | Koenemann | 60/649 |
| 2,335,012 | A | * 11/1943 | Johnston | 252/78.3 |
| 2,910,244 | A | 10/1959 | Payne | |
| 3,429,816 | A | 2/1969 | Giolito et al. | |
| 3,608,624 | A | 9/1971 | Hasselriis | |
| 3,701,473 | A | 10/1972 | Teller | |
| 3,753,345 | A | * 8/1973 | Cassidy et al. | 60/671 |
| 3,931,028 | A | 1/1976 | Jackson et al. | |
| 3,962,999 | A | 6/1976 | Rehm | |
| 4,044,727 | A | 8/1977 | Rychen et al. | |
| 4,072,184 | A | 2/1978 | Hinkle | |
| 4,146,084 | A | 3/1979 | Hinkle | |
| 4,191,243 | A | 3/1980 | Donzis | |
| 4,237,964 | A | * 12/1980 | Larue et al. | 165/104.13 |
| 4,278,073 | A | 7/1981 | Canzano | |
| 4,340,207 | A | 7/1982 | Bruhn et al. | |
| 4,392,972 | A | 7/1983 | Mohr et al. | |
| 4,545,925 | A | 10/1985 | Bosen et al. | |
| 4,559,993 | A | 12/1985 | Picard et al. | |
| 4,622,160 | A | 11/1986 | Buske et al. | |
| 4,760,705 | A | 8/1988 | Yogev et al. | |
| 4,819,586 | A | 4/1989 | Kreuter | |
| 4,854,378 | A | 8/1989 | Zappia | |
| 4,892,064 | A | 1/1990 | Zappia | |
| 4,953,634 | A | 9/1990 | Nelson et al. | |
| 5,002,123 | A | 3/1991 | Nelson et al. | |
| 5,075,022 | A | 12/1991 | Gambell et al. | |
| 5,156,006 | A | 10/1992 | Broderdorf et al. | |
| 5,242,621 | A | 9/1993 | Miller et al. | |
| 5,256,258 | A | 10/1993 | Seifert et al. | |
| 5,352,336 | A | 10/1994 | Seifert et al. | |
| H1393 | H | * 1/1995 | Buske | 252/73 |
| 5,384,059 | A | 1/1995 | Klein et al. | |
| 5,390,646 | A | 2/1995 | Swenson | |
| 5,429,753 | A | 7/1995 | Hilgren | |
| 5,485,953 | A | 1/1996 | Bassett et al. | |
| 5,569,389 | A | 10/1996 | Hilgren | |
| 5,720,818 | A | 2/1998 | Donde et al. | |
| 5,799,626 | A | 9/1998 | Ponsford et al. | |
| 5,904,776 | A | 5/1999 | Donde et al. | |
| 6,022,488 | A | 2/2000 | Damiani et al. | |
| 6,086,782 | A | 7/2000 | Hsu et al. | |
| 6,143,943 | A | 11/2000 | Oroskar et al. | |
| 6,309,740 | B1 | 10/2001 | Shu et al. | |
| 6,374,907 | B1 | 4/2002 | Tousignant et al. | |
| 6,412,281 | B2 | * 7/2002 | Cover | 60/670 |
| 6,432,320 | B1 | 8/2002 | Bonsignore et al. | |
| 6,447,692 | B1 | 9/2002 | Momoda et al. | |
| 6,736,329 | B2 | 5/2004 | Doclo | |
| 6,742,593 | B2 | 6/2004 | Vinegar et al. | |
| 6,797,193 | B1 | 9/2004 | Guillaume | |
| 6,797,193 | B2 | 9/2004 | Brown et al. | |
| 6,888,036 | B2 | 5/2005 | Commandeur | |
| 6,896,404 | B2 | 5/2005 | Seki et al. | |
| 6,938,687 | B2 | 9/2005 | Holl | |
| 6,953,082 | B2 | 10/2005 | Costello et al. | |
| 6,974,552 | B1 | 12/2005 | Hsu et al. | |
| 6,983,614 | B2 | 1/2006 | Dick et al. | |
| 7,011,765 | B2 | 3/2006 | Commandeur | |
| 7,055,579 | B2 | 6/2006 | Costello et al. | |
| 7,069,732 | B2 | 7/2006 | Walker et al. | |
| 7,091,309 | B2 | 8/2006 | Brown et al. | |
| 7,128,133 | B2 | 10/2006 | Costello et al. | |
| 7,147,823 | B2 | 12/2006 | Loewen | |
| 7,156,156 | B2 | 1/2007 | Haller et al. | |
| 7,225,621 | B2 | 6/2007 | Zimron et al. | |
| 7,238,299 | B2 | 7/2007 | Singh et al. | |
| 7,241,398 | B2 | 7/2007 | Minor et al. | |
| 7,282,159 | B2 | 10/2007 | Sunkara et al. | |
| 7,343,753 | B2 | 3/2008 | Kidwell et al. | |
| 7,347,059 | B2 | 3/2008 | Kidwell et al. | |
| 7,370,488 | B2 | 5/2008 | Kidwell et al. | |
| 7,373,785 | B2 | 5/2008 | Kidwell et al. | |
| 7,377,122 | B2 | 5/2008 | Kidwell et al. | |
| 2007/0263356 | A1 | * 11/2007 | Weber et al. | 361/700 |
| 2009/0044935 | A1 | * 2/2009 | Nutsos | 165/301 |
| 2013/0008433 | A1 | * 1/2013 | Hahn et al. | 126/674 |

FOREIGN PATENT DOCUMENTS

| | | | |
|---|---|---|---|
| JP | 57204757 A | * | 12/1982 |
| JP | 10068598 A | * | 3/1998 |
| WO | WO 89/07634 | | 8/1989 |

OTHER PUBLICATIONS

Johns et al., "Thermal Stability of Some Organic Compounds," *Journal of Chemical and Engineering Data*, (1962), 7(2):277-281.

Johns et al., "Thermal Stability of Organic Compounds,"*I & EC Product Research and Development*, (1962), 1:2-6.

Bird et al., *Transport Phenomena*, Second Edition, published by John Wiley & Sons, Inc. (2007), pp. 28-35.

Blair et al. (May 3-8, 2008) "Modeling Photovoltaic and Concentrating Solar Power Trough Performance, Cost, and Financing with the Solar Advisor Model," In; National Renewable Energy Laboratory, Solar 2008—American Solar Energy Society (ASES). San Diego, California.

Brooke et al. (2008). GAMS—A User's Guide. *GAMS Development Corporation*. Washington, DC, USA.

Chopra et al. (2006) "Order-parameter-based Monte Carlo simulation of crystallization," *J. Chem. Phys*. 124:134102.

Dow Chemical Co. "Dowtherm A," *DOW Chemical Co*. Form No. 176-01463. Midland, MI.

European Commission Community Research (2005) "Solgate, solar hybrid gas turbine electric power system," Contract ENK5-CT-2000-00333. Final Publishable Report. European Community 5th RTD Framework Programme.

Faller et al. (2003) "Density of states of a binary Lennard-Jones glass," *J. Chem. Phys*. 119:4405-4408.

Fraser (Jan. 14, 2008) "Stirling Dish System Performance Prediction Model," M.S. Thesis, Solar Energy Laboratory. University of Wisconsin-Madison.

Jones et al. (Apr. 21-25, 2001) "TRNSYS Modeling of the SEGS VI Parabolic Trough Solar Electric Generating System," In; Proc. of the Solar Forum 2001, ASME. Washington DC.

Jorgensen et al. (1993) "Monte Carlo simulations of pure liquid substituted benzenes with OPLS potential functions," *J. Comp. Chem*. 14:206-215.

Jorgensen et al. (1996) "Development and testing of the OPLS all-atom force field on conformational energetics and properties of organic liquids," *J. Am. Chem. Soc*. 18:11225-11236.

Jorgensen et al. (1998) "Development of an all-atom force field for heterocycles. Properties of liquid pyridine and diazenes," *Theochem J. Mol. Struct*. 424:145-155.

Khare et al. (2004) "Simulation of vapor-liquid phase equilibria of primary alcohols and alcohol-alkane mixtures," *J. Phys. Chem. B*. 108:10071-10076.

Klein et al. (2007) "TRNSYS 16—A Transient System Simulation Program," Version 16, Solar Energy Laboratory, University of Wisconsin—Madison.

Kondili et al. (1993) "General Algorithm for Short-Term Scheduling of Batch Operations—I. MILP Formulation," *Comput. Chem. Eng*. 17:211-227.

Lata et al. (May 2008) "High Flux Central Receivers of Molten Salts for the New Generation of Commercial Stand-Alone Solar Power Plants," *J. Solar Energy Engineering*. vol. 130.

Maravelias (2005) "Mixed Time Representation for State-Task Network Models," *Ind. Eng. Chem. Res*. 44(24):9129-9145.

(56) References Cited

OTHER PUBLICATIONS

Maravelias et al. (2003) "A New General Continuous-Time State Task Network Formulation for the Short-Term Scheduling of Multipurpose Plants," *Ind. Eng. Chem. Res.* 42(13):3056-3074.

Maravelias et al. (2006) "On the Relation of Continuous and Discrete Time Models for the State-Task Network Formulation," *AIChE J.* 52(2):843-849.

Mastny et al. (2005) "Direct calculation of solid-liquid equilibria from density-of-states Monte Carlo simulations," *J. Chem. Phys.* 122:124109.

McDonald et al. (1998) "Development of an all-atom force field for heterocycles. Properties of liquid pyrrole, furan, diazoles, and oxazoles," J. Chem. Phys. B, 102, 8049-8059 (1998).

McMahan (2006) "Design and Optimization of Organic Rankine Cycle Solar-Thermal Powerplants," M.S. Thesis, Solar Energy Laboratory, University of Wisconsin-Madison.

National Renewable Energy Laboratory (Last Updated Apr. 5, 2010) "Solar Advisor Model (SAM)," *National Renewable Energy Laboratory*. https://www.nrel.gov/analysis/sam/ [Last Accessed Aug. 19, 2014].

Patnode (2006) "Simulation and Performance Evaluation of Parabolic Trough Solar Power Plants," M.S. Thesis, Solar Energy Laboratory. University of Wisconsin-Madison.

Prasad et al. (2006) "Optimization of Aluminum Smelter Casthouse Operations," Ind. Eng. Chem. Res. 45(22):7603-7617.

Rai et al. (2007) "Transferable potentials for phase equilibria. 9. Explicit hydrogen description of benzene and five-membered and six-membered heterocyclic aromatic compounds," *J. Phys. Chem. B.* 111:10790-10799.

Reilly et al. (2001) "An Evaluation of Molten-Salt Power Towers Including Results of the Solar Two Project," Sandia National Laboratories. Report No. SAND2001-3674.

Schwarzbozl et al. (Nov. 2006) "A TRNSYS Model Library for Solar Thermal Electric Components (STEC)," *Solar Paces*. Release 3.0.

Siangsukone et al. (2003) "Modelling of a 400m2 steam based Paraboloidal Dish concentrator for solar thermal power production,", ANZSES 2003 Destination Renewables, Centre for Sustainable Energy Systems, Australian National University. Canberra, ACT 0200.

Solutia (1999) "Therminol VP-1," *Solutia*. Technical Bulletin 7239115B. St. Louis, MO.

Solutia (2008) "Therminol 75," *Solutia*. Technical Bulletin 7239531A. St. Louis, MO.

Sum et al. (2003) "Predictive molecular model for the thermodynamic and transport properties of triacylglycerols," *J. Phys. Chem. B.* 107:14443-14451.

Sundaramoorthy et al. (Feb. 9, 2008) "Simultaneous Batching and Scheduling in Multi-stage Multi-product Processes," *Ind. Eng. Chem. Res.* 47(5):1546-1555.

Sung et al. (2007) "An Attainable Region Approach for Effective Production Planning of Multi-product Processes," *AIChE J.* 53(5):1298-1315.

Wagner (2008) "Simulation and Predictive Performance Modeling of Utility-Scale Central Receiver System Power Plants," M.S. Research Activity. Solar Energy Laboratory, University of Wisconsin-Madison.

Yan et al. (2002) "Density-of-states Monte Carlo method for simulation of fluids," *J. Chem. Phys.* 116:8745-8749.

Yan et al. (2003) "Fast calculation of the density of states of a fluid by Monte Carlo simulations," *Phys. Rev. Lett.* 90:035701.

\* cited by examiner

EXTENDED-RANGE HEAT TRANSFER FLUID USING VARIABLE COMPOSITION

CROSS REFERENCE TO RELATED APPLICATION

This application claims priority under 35 U.S.C. §119(e) to U.S. Provisional Patent Application No. 61/239,883, filed on Sep. 4, 2009, which is hereby incorporated by reference in its entirety.

BACKGROUND OF THE INVENTION

Solar power is a renewable resource that continues to generate interest as an alternative to fossil fuels. Solar photovoltaic panels have been historically inefficient in converting sunlight into electrical energy as compared to the cost of the panels themselves. As an alternative to photovoltaics, interest in collecting heat from the sun for use in steam driven power plants has grown. This process involves collecting heat from the sun using thermal or reflective panels. This heat is used to warm a heat transfer fluid which, in turn, transfers the absorbed heat to water to produce high-pressure superheated steam which can be used to power turbines in power plants. The cooled heat transfer fluid exits the steam generator and re-circulates to the collecting panels. To optimize efficiency, it is important to operate heat absorption by the heat transfer fluid at a suitably high operating temperature. The keys to improving the effectiveness of the heat transfer fluid are to provide a fluid that does not have an excessive vapor pressure at very high temperature, remains liquid at ambient temperature, and does not chemically degrade at operating temperatures.

The dominant concentrating solar power plant configurations use a specialized heat transfer fluid to carry thermal energy from the collector to a separate steam generator to ensure stable, safe operation. Parabolic trough systems, for example, use a linear parabolic concentrator with receivers in an evacuated enclosure to reduce convection losses. The heat transfer fluid is circulated through the receivers throughout the solar field. An ideal heat transfer fluid is pumpable at ambient temperatures and yet remains stable with a low vapor pressure at the highest operating temperatures. Current solar collector systems operate at temperatures up to 400° C., limited by the upper operational temperature limit of heat transfer fluids currently used in these systems. This limits attainable steam temperature to temperatures substantially lower than those obtained in coal-fired power plants (e.g., up to 650° C.). Therefore, the thermal efficiency of steam turbine generators in solar power plants is currently lower than the thermal efficiency achievable in modern fossil fuel power plants. A new advanced heat transfer fluid that remains liquid up to a maximum service temperature near 500° C. or above, with desirable fluid properties and satisfactorily low vapor pressure, and that additionally remains liquid at temperatures as low as 80° C. or even outdoor nighttime ambient temperature, would improve performance of parabolic trough concentrating solar power plants. Increasing the maximum operating temperature above the current limit (near 400° C.) increases the overall efficiency of the Rankine cycle electrical power generation from near 37% to about 41%, and allows an increase of 10% in electric power production from the same collection mirrors and the same solar energy input. Such an advance will be a key contribution in current work to improve the economics and efficiency of electricity derived from concentrating solar power plants. Therefore, it is desirable to develop concentrating solar power systems and methods having improved heat transfer fluids and operating strategies.

The liquids currently used in parabolic troughs (solar heat collecting devices) are organic fluids which are capable of being heated to 380° C.-400° C. under pressure. Researchers have attempted to use higher molecular weight fluids which will not evaporate at higher temperatures (500° C. and over), but these fluids tend to solidify above ambient environmental temperatures (10-30° C.), making it difficult to use them as heat transfer fluids as the liquid solidifies in the pipes of the heat exchange system when the system cools at night or in absence of solar input. Additionally, conventional heat transfer fluids may be organic, aqueous, molten salt, or molten metal. Many oils and other organic compounds have been useful. When exposed to high temperatures, however, many organics begin to decompose, either by degrading into smaller fragments or by producing higher-molecular weight deposits. The small fragments usually have higher vapor pressures and increase system pressure unduly, while higher-molecular weight deposits lead to fouling and decreased heat transfer efficiency. For high-temperature use, aromatic compounds are more stable against decomposition than aliphatic compounds. A mixture currently used for high thermal stability and wide operating temperature range is a mixture of biphenyl and diphenyl oxide. These compounds have almost identical vapor pressures, boiling at 258° C. at 1 atm. The respective melting points are 80° C. and 35° C., but a eutectic mixture of 26.5% biphenyl/73.5% diphenyl oxide has a melting point of 12° C., so the operating range may extend below ambient temperature. When the upper pressure limit is about 10 atmospheres, the eutectic mixture has an upper operating temperature limit of about 400° C. This mixture is commercially available as Therminol VP-1 (Solutia) and Dowtherm A (Dow). Chemical stability also becomes an issue at yet higher temperatures, as the biphenyl/diphenyl oxide system shows slow decomposition that produces small fragments including hydrogen. This combination of high vapor pressure and hydrogen generation thus prevents this heat transfer system from use in many metal heat transfer systems above 400° C. This biphenyl/diphenyl oxide system is used as the organic fluid, for example, in the Kramer Junction parabolic trough systems.

Beyond organic fluids, the alternatives are presently less attractive for solar power applications. Direct steam production can be accomplished in a parabolic trough collector but only at pressures above the critical point of water (220 bar). Molten salts can be used at temperatures of 500° C. or higher with low vapor pressure and other attractive heat transfer characteristics. Conventional salts freeze at high temperatures, however, often 200° C. or higher depending on the composition of the salt. The eutectic mixture of sodium nitrate, sodium nitrite, and potassium nitrate (marketed as Hitec salt) has one of the lowest melting points (142° C.). The freezing of a salt at an overnight low temperature is particularly inconvenient in a parabolic trough system, likely requiring a large amount of piping that would need to be heat-traced. Molten metals have desirable features for heat transfer at high temperature, but their high reactivity and handling hazards make them more suitable for sustained high-temperature use, such as for nuclear power, than for the widely varying temperatures experienced during the daily temperature cycle of a concentrating solar power system. Because of the high heat flux at the receiver surface, vapor-phase and boiling heat transfer fluids are not favored for heat collection at the focus of a concentrating solar power collector.

In the power tower configuration, energy collection occurs by directing a solar photon flux to a central tower receiver prior to heat collection by a heat transfer fluid for steam generation. The operating temperature can thus be higher if the fluid has sufficiently low vapor pressure and high thermal stability. The overnight heat losses are less severe, thus the minimum temperature is not as low as in parabolic trough systems. Therefore, both the parabolic trough and power tower configurations will benefit from improvements in the maximum service temperature of a new heat transfer fluid.

U.S. Pat. No. 2,910,244, issued on Oct. 27, 1959, discloses methods and apparatus for the transfer of heat by means of a molten heat transfer medium which is solid at room temperature. This reference discloses incorporating a volatile solvent to the medium under pressure and in an amount sufficient to maintain the liquid phase in the system on cooling down. Specific mixtures include a water soluble salt or salt mixture and water.

U.S. Pat. No. 4,278,073, issued on Jul. 14, 1981, discloses a system, method and apparatus for converting solar energy to heat and shaft work utilizing a mixture of two compatible fluids. One fluid has a low boiling point, and the other has a high boiling point. The high-boiling point fluid disclosed in this patent has a boiling point no less than 250° F. High-boiling fluids exemplified in this reference include Dowtherm J, Therminol, and glycols and exemplified low-boiling fluids include Freon and alcohols.

It will be appreciated from the foregoing that there is currently a need for improved methods and systems providing heat transfer fluids that remain liquid over a broad operating temperature range.

SUMMARY OF THE INVENTION

The present invention provides systems and methods for transferring heat using a variable composition organic heat transfer fluid that remains liquid over a wide operating temperature range useful for solar heating applications. Variable composition heat transfer fluids of the present invention comprise a miscible mixture, optionally a completely miscible mixture, of a high boiling point component selected for its beneficial high temperature physical properties, and a low freezing point component selected for its beneficial low temperature physical properties. The low freezing point component is removed from the heat transfer fluid as the heat transfer fluid is heated, for example by being removed in the vapor phase, in a controlled manner thereby varying the composition and physical properties (e.g., vapor pressure, boiling point, freezing point, thermal stability, etc.) of the heat transfer fluid as a function of temperature. As the temperature of the heat transfer fluid increases, the heat transfer fluid becomes enriched in the high boiling point component. Enrichment of the high boiling point component is useful for increasing the boiling point temperature of the heat transfer fluid and lowering the vapor pressure of the heat transfer fluid at high temperatures, thereby extending the operating temperature of the heat transfer fluid. In addition, removal of the low freezing point component reduces the occurrence and rate of thermal degradation of the heat transfer fluid at high operating temperatures, for example, at the high operating temperatures experienced in solar heating applications. In some embodiments, for example, the low freezing point component is returned (e.g., in the liquid phase and/or vapor phase) to the heat transfer fluid as the temperature of the heat transfer fluid decreases. Addition of the low freezing point component to the heat transfer fluid is useful for lowering the freezing point temperature of the heat transfer fluid, thereby ensuring that it does not solidify during a given temperature cycle. Addition of the low freezing point component is useful for example, to prevent freezing as the temperature decreases below the freezing temperature of the high boiling point component alone (i.e., below the freezing temperature of pure high boiling point component). Therefore, incorporation of the low freezing point component maintains the heat transfer fluid in a liquid state at lower temperatures than would otherwise be feasible using a heat transfer fluid consisting of the high boiling point component alone.

The present invention provides a heat transfer system including a variable composition heat transfer fluid useful for extending the range of operating temperatures by maintaining the heat transfer fluid in the liquid state during temperature cycling and during cooldown and/or periods without solar input. In a specific embodiment, a heat transfer system of the present invention comprises: (i) a heat transfer fluid, wherein the heat transfer fluid comprises a high boiling point component and a low freezing point component provided in a miscible mixture, optionally a completely miscible mixture, wherein the high boiling point component and the low freezing point component each comprise one or more organic compounds; (ii) a vessel for containing the heat transfer fluid; (iii) a heat source for heating the heat transfer fluid; (iv) an outlet for removing at least a portion of the low freezing point component from said heat transfer fluid upon increasing temperature of the heat transfer fluid, wherein the low freezing point component is removed as a vapor, thus allowing facile separation of the removed low freezing temperature component; and (v) an inlet for adding at least a portion of the removed low freezing point component to the heat transfer fluid upon decreasing temperature of the heat transfer fluid, thereby maintaining said heat transfer fluid in the liquid state.

In certain embodiments, the system is configured such that at least a portion of the low freezing point component is removed from the heat transfer fluid upon raising the temperature as a vapor via expansion or pumping through an outlet or valve connected to the vessel containing the heat transfer fluid. In certain embodiments, the system is configured such that at least a portion of the removed low freezing point component is returned to the vessel containing the heat transfer fluid upon cooling via pumping or otherwise establishing a return flow of the low freezing point component. In an embodiment, for example, the system is configured such that at least a portion of the low freezing point component is added to the heat transfer fluid in a liquid state when the overall system temperature decreases. In an embodiment, the heat transfer system further comprises a condenser in fluid communication with the outlet for condensing into a liquid state the low freezing point component removed as a vapor, thereby generating removed low freezing point component in the liquid phase. Additionally, a rectifying column may be placed between the outlet and the condenser, to return the high boiling point component as a liquid to the heat transfer system and aid in more selectively removing the low freezing point component at relatively high concentration. In an embodiment, the condenser or a storage tank used to accumulate fluid as it collects is also in fluid communication with the inlet for returning at least a portion of the condensed low freezing point component to the heat transfer fluid upon decreasing temperature of the heat transfer fluid. Depending on the low temperature achieved during an overnight cooldown or a multi-week shutdown, appropriate quantities of the low-freezing component could be added to maintain the liquid state and avoid undesirable solidification of the working heat transfer fluid in the collection flow loop. The appropriate quantity is determined by consideration of the variation of mixture solidification temperature with mixture composition.

In a preferred embodiment, the heat transfer fluid of the present invention is a variable composition heat transfer fluid. As used herein, variable composition refers to a heat transfer fluid wherein the mass fraction(s) of the high boiling point component, low freezing point component or both vary over a range of operating temperatures (e.g., 0-500° C.) such as the operating temperatures achieved during a temperature cycle in a concentrating solar power system, including when the system cools at night or in absence of solar input. Variable component heat transfer fluids may have a mass fraction(s) of the high boiling point component, low freezing point component or both that varies as a function of temperature of the heat transfer fluid and/or the vapor pressure of the heat transfer fluid. As used herein, mass fraction of refers to the mass of a particular component of the heat transfer fluid (e.g., mass of the high boiling point component or mass of the low freezing point component) divided by the total mass of the heat transfer fluid:

$$MF_{High\,BP} = \frac{\text{(Mass of High Boiling Point Component)}}{\text{(Mass of Heat Transfer Fluid)}} \qquad (I)$$

$$MF_{Low\,FP} = \frac{\text{(Mass of Low Freezing Point Component)}}{\text{(Mass of Heat Transfer Fluid)}}; \qquad (II)$$

wherein $MF_{High\,BP}$ is the mass fraction of the high boiling point component and $MF_{Low\,FP}$ is the mass fraction of the low freezing point component. In an embodiment, the heat transfer fluid has a mass fraction of the high boiling point component at 25° C. is selected over the range of 40-99%, more preferably for some applications selected over the range of 50-60%. In an embodiment, the heat transfer fluid has a mass fraction of the low freezing point component at 25° C. is selected over the range of 60-30%, more preferably for some applications selected over the range of 1-50%.

In an embodiment, the mass fraction of the high boiling point component increases and the mass fraction of the low freezing point component decreases upon increasing temperature of the heat transfer fluid. In an embodiment, the mass fraction of the high boiling component increases once the vapor pressure of the heat transfer fluid reaches a pressure equal to or greater than the vapor pressure of the low freezing point component, and/or a pressure equal to or greater than 5 atmospheres, or preferably for some embodiments 10 atmospheres. In an embodiment, the mass fraction of the high boiling component increases once the vapor pressure of the heat transfer fluid reaches a pressure equal to a preselected, desired maximum operating pressure. In an embodiment, the mass fraction of the high boiling point component varies from 40% to 99% (or higher) over the operating temperature cycle of a concentrating solar power system, such as a parabolic trough power system. In an embodiment, the mass fraction of the high boiling point component increases from 40% to 99% (or higher) upon increasing temperature from an initial temperature to a desired maximum operating temperature, for example from an initial temperature of 25° C. to a desired maximum operating temperature of 500° C. In an embodiment, the mass fraction of the low freezing point component varies from 60% to 1% (or lower) over the operating temperature cycle of a concentrating solar power system, such as a parabolic trough power system. In an embodiment, the mass fraction of the low freezing point component decreases from 60% to 1% (or lower) upon increasing temperature from an initial temperature to a desired maximum operating temperature, for example from an initial temperature of 25° C. to a desired maximum operating temperature of 500° C.

In another aspect, the mass fraction of the high boiling point component decreases and the mass fraction of the low freezing point component increases upon decreasing temperature of the variable component heat transfer fluid. In an embodiment, the mass fraction of the high boiling component decreases once the vapor pressure of the heat transfer fluid reaches a pressure equal to or less than the vapor pressure of the low freezing point component. In another embodiment, the mass fraction of the high boiling component decreases once the vapor pressure of the heat transfer fluid achieves a pressure equal to a preselected, desired maximum operating pressure, for example a pressure equal to or less than 5 atmospheres, or 10 atmospheres for some applications. In a specific embodiment, the mass fraction of the high boiling point component decreases from 99% (or higher) to 40% upon lowering the temperature from a desired maximum operating temperature to an initial temperature, for example from a desired maximum operating temperature of 500° C. to an initial temperature of 25° C. In a specific embodiment, the mass fraction of the low freezing point component increases from 1% (or lower) to 60% upon lowering the temperature from a desired maximum operating temperature to an initial temperature, for example from a desired maximum operating temperature of 500° C. to an initial temperature of 25° C.

In one embodiment, the outlet of the heat transfer system is a pressure sensitive valve for removing at least a portion of the low freezing point component in the vapor state. For example, the pressure sensitive valve opens and removes the low freezing point component vapor from the heat transfer fluid when the vapor pressure of the heat transfer fluid reaches a preselected pressure. In an embodiment, the preselected pressure at which the pressure sensitive valve opens and removes low freezing point component vapor is equal to the vapor pressure of the low freezing point component at a preselected temperature. In a specific embodiment, the pressure sensitive valve opens and removes low freezing point component vapor from the heat transfer fluid when the vapor pressure of the heat transfer fluid is greater than 1 atmosphere. In an embodiment, for example, the pressure sensitive valve opens and removes low freezing point component vapor from the heat transfer fluid when the vapor pressure of the heat transfer fluid is a pressure selected over the range of 1 atmospheres to 20 atmospheres, and/or when the vapor pressure of the heat transfer fluid is equal to a chosen operating pressure where the low-boiling component has a vapor pressure at the desired maximum pressure.

In another aspect, the outlet for removing the low freezing point component vapor is a temperature sensitive valve. In certain embodiments, the temperature sensitive valve opens and removes the low freezing point component vapor from the heat transfer fluid when the temperature of the heat transfer fluid reaches a preselected temperature. In an embodiment, the preselected temperature at which the temperature sensitive valve opens and removes low freezing point component vapor is equal to the temperature of the heat transfer fluid at which the low freezing point component boils. In a specific embodiment, the temperature sensitive valve opens and removes low freezing point component vapor from the heat transfer fluid when the heat transfer fluid reaches a temperature where the low-boiling component has a vapor pressure equal to the desired maximum pressure.

In one embodiment, the inlet of the heat transfer system is a pressure activated valve for adding at least a portion of the removed low freezing point component to the heat transfer fluid. In certain embodiments, the pressure activated valve opens and adds low freezing point component as a liquid or vapor to the heat transfer fluid when the vapor pressure of the heat transfer fluid drops to or below a preselected pressure in the vessel containing the heat transfer fluid. In an embodiment, the preselected pressure, at which the pressure activated valve opens and adds low freezing point component to the heat transfer fluid, is equal to the vapor pressure of the low freezing point component. In a specific embodiment, the pressure activated valve opens and adds low freezing point component to the heat transfer fluid when the pressure of the heat transfer fluid drops to or below a value selected over the range of 1 atmosphere and the desired maximum operating pressure of the system, such as a value selected over the range of 1 atmosphere to 20 atmosphere. In a specific embodiment, the pressure activated valve opens and adds low freezing point component to the heat transfer fluid when the pressure of the heat transfer fluid drops to or below a pressure equal to half the maximum operating pressure. In another embodiment, the inlet for adding the low freezing point component to the heat transfer fluid is a temperature activated valve. For example, the temperature activated valve opens and adds low freezing point component to the heat transfer fluid when the temperature of the heat transfer fluid drops to or below a preselected temperature. In an embodiment, the temperature activated valve opens and adds low freezing point component liquid to the heat transfer fluid when the temperature of the heat transfer fluid drops to or below the temperature at which the low freezing point component boils.

Additionally, the outlet and inlet of the heat transfer system may further comprise any effective device for removing low freezing point component vapor or adding low freezing point component, respectively. For example, the outlet and inlet may be an automated (e.g., computer-controlled) valve or opening, or a manually-controlled valve or opening.

In an aspect, the heat transfer systems and methods of the present invention maintain the heat transfer fluid in the liquid state by removing low freezing point component vapor as the temperature of the heat transfer fluid rises, and by returning at least a portion of the low freezing point component as the heat transfer fluid cools during temperature cycling. In an embodiment, the variable composition heat transfer fluid of the present invention remains in a liquid state within a temperature range of 0° C. to 500° C. In a preferred embodiment, a variable heat transfer fluid composition of the present invention provides a freezing point temperature less than 80° C. and preferably less than 20° C. In an embodiment, a variable heat transfer fluid composition of the present invention has a boiling point at 10 atmospheres pressure greater than 500° C.

In another aspect, variable heat transfer fluid compositions of the present invention do not solidify at ambient temperatures (e.g. 10° C.-30° C.), and additionally demonstrate preferred high temperature (e.g. temperatures greater than 400° C.) properties, such as enhanced chemical stability and thermal stability. Additionally, variability of the composition of the heat transfer fluid of the present invention allows access to advantageous low temperature properties of the heat transfer fluid such as low freezing temperatures and viscosities less than 500 cP, optionally less than 1 cP, at operating temperatures (e.g., (e.g. 0° C.-500° C.)).

In an aspect, variable composition heat transfer fluids of the present invention comprise a miscible mixture of a high boiling point component, selected for its high temperature properties, and a low freezing point component, selected for its low temperature properties. In an embodiment, the low freezing point component is removed in the vapor state from the heat transfer fluid as the heat transfer fluid is heated during temperature cycling, for example when the temperature of the heat transfer fluid increases above the boiling point of the low freezing point component. As the heat transfer fluid temperature continues to rise during temperature cycling, the heat transfer fluid becomes enriched in the high boiling point component, thereby decreasing the vapor pressure of the heat transfer fluid. The low freezing point component is added to the heat transfer fluid as the temperature of the heat transfer fluid drops during temperature cycling. Addition of the low freezing point component liquid ensures that the high boiling point component does not solidify as the temperature of the heat transfer fluid decreases below the freezing point of the high boiling point component alone. This maintains the heat transfer fluid in a liquid state at lower temperatures than would otherwise be accessible using a heat transfer fluid consisting of the high boiling point component alone.

The high boiling component and low freezing component may be chosen to be miscible in the liquid phase at all proportions to be used during the application. In an embodiment, the two components are likely to have similar or compatible molecular structures and may be high molecular weight and low molecular weight members of a family of related compounds. Provided that they are not strongly interacting, the vapor-liquid equilibrium behavior will be regular, not exhibiting inconvenient non-idealities such as azeotropes, and any mixture will have boiling behavior (described by the bubble line and dew line in a phase diagram) that varies smoothly between the boiling points of the two components as composition varies over the range. The freezing point will also vary with composition over the range of composition. For components which are mutually soluble in the solid phase, the freezing point may vary between the freezing points of the two components. In a more desirable embodiment, when the two solid species are not mutually soluble, each component will decrease the freezing point of the other component and there will be a range of compositions where the mixture freezing point is lower than either of the single-component freezing points. In these cases, the phase diagram will contain a eutectic point at the minimum freezing point. This behavior is displayed by a large number of systems where the molecular structures of the two components differ slightly; it is commonly used in known fixed-composition heat transfer fluids such as molten metal alloys and the biphenyl/diphenyl oxide system to determine a composition with a freezing point conveniently lower than either pure component. In the present concept of a variable-composition heat transfer fluid, the low service temperature is determined by the freezing point of the mixture at one chosen composition, while the high service temperature is determined by the vapor pressure of the mixture at the second chosen composition. The calculated phase coexistence boundaries shown herein are consistent with the data tabulated for some of these mixtures in Timmermans, J., "The physico-chemical constants of binary systems in concentrated solutions," Interscience Publishers, New York, 1959.

In some embodiments, the high boiling point component of the heat transfer fluid comprises one or more organic compound(s) selected from the group consisting of poly-phenyl compounds, polynuclear aromatic compounds, heterocyclic compounds, substituted aromatic compounds, perfluorinated ring compounds, and aromatic silanes. In an embodiment, the high boiling point component of the heat transfer fluid comprises one or more polynuclear aromatic compound(s) selected from the group consisting of substituted or unsubstituted diphenyl oxide, biphenyl, o-terphenyl, m-terphenyl, p-terphenyl, anthracene, phenanthrene, pyrene, triphenylene, chrysene, perylene, coronene, and benzopyrene. In an embodiment, the high boiling point component comprises a single organic compound. Alternative, the invention includes heat transfer fluids wherein the high boiling point component comprises a plurality of organic compounds.

In an embodiment of this aspect, the low freezing point component comprises one or more organic compound(s) and is chosen for its low temperature properties and its compatibility (e.g., miscilibility) with the high boiling point component. In an embodiment, the low freezing point component has a boiling point temperature that is less than the boiling point temperature of the high boiling point component. In an embodiment, for example, the low freezing point component has a freezing point temperature less than or equal to 80° C., preferably for some applications less than or equal to 20° C. and preferably for some applications less than or equal to 5° C. In an embodiment, for example, the low freezing point component has a freezing point temperature selected over the range of 0° C. to 80° C., preferably for some applications selected over the range of 0° C. to 20° C. In an embodiment, the low freezing point component has a molecular weight that is less than the molecular weight of the high boiling point component.

The low freezing point component of the heat transfer fluid preferably comprises one or more organic compound(s) that are miscible with the high boiling point component selected from the group consisting of poly-phenyl compounds, polynuclear aromatic compounds, heterocyclic compounds, substituted aromatic compounds, perfluorinated ring compounds, and aromatic silanes. In a specific embodiment, the low freezing point component of the heat transfer fluid comprises one or more polynuclear aromatic compound(s) selected from the group consisting of substituted or unsubstituted benzene, toluene, diphenyl oxide, biphenyl, o-terphenyl, m-terphenyl, and naphthalene. In an embodiment, the low freezing point component comprises a single organic compound. Alternative, the invention includes heat transfer fluids wherein the low freezing point component comprises a plurality of organic compounds.

In a specific embodiment, the heat transfer fluid of the present invention is a mixture of m-terphenyl and toluene, wherein the high boiling point component is m-terphenyl and the low freezing point component is toluene. In an embodiment of this aspect, the heat transfer fluid is a mixture of m-terphenyl and toluene, wherein the mass fraction of m-terphenyl at 25° C. is selected over the range of 40-70%, more preferably for some applications selected over the range of 50-60%. This system can have a boiling point at 5 atm of up to 475° C. as the fluid approaches pure m-terphenyl. The freezing point decreases as the toluene mass fraction increases, and can be near 20° C. for 50% m-terphenyl or 0° C. for 30% m-terphenyl. This mixture would exhibit a eutectic and a minimum freezing temperature at yet lower fraction m-terphenyl.

In another embodiment, the heat transfer fluid of the present invention is a mixture of pyrene and benzene, wherein the high boiling point component is pyrene and the low freezing point component is benzene. In an embodiment of this aspect, the heat transfer fluid is a mixture of pyrene and benzene, wherein the mass fraction of pyrene at 25° C. is selected over the range of 40-70%, more preferably for some applications selected over the range of 50-60%. This system would have a freezing point that decreases from 156° C. to below 5° C. as the pyrene mass fraction decreases from 100% to approximately 15%. Other embodiments may use naphthalene in place of some or all of the benzene as the low freezing component, for alternative stability or other properties. Naphthalene also suppresses the freezing point of pyrene and shows a eutectic: naphthalene freezes at 80° C., pyrene freezes at 156° C., the eutectic around 64% naphthalene and 36% pyrene solidifies at approximately 63° C. The freezing point of any mixture with 0 to 44% pyrene is below the 80° C. freezing point of pure naphthalene. Mixtures of all three components will show further reductions in freezing point.

In some embodiments, the heat transfer fluid of the present invention may further comprise an additive component, such as a chemical or nanoparticle additive, in order to improve one or more properties of the fluid, including but not limited to viscosity, specific heat capacity or chemical degradation. In an embodiment, the nanoparticle additive increases the viscosity, specific heat capacity, or both viscosity and specific heat capacity of the heat transfer fluid. For example, as the temperature of the heat transfer fluid increases and the low freezing point component is removed, the heat transfer fluid becomes more enriched in the nanoparticle additive, thereby increasing the viscosity and/or specific heat capacity of the heat transfer fluid. In another embodiment, the nanoparticle additive provides functionality for scavenging radicals and preventing radical chain decomposition reactions within the heat transfer fluid, and/or provides functionality suitable for enhancing the rate of recombination of decomposition fragments associated with the heat transfer fluid. In a specific embodiment, the nanoparticle additive comprises nanoparticles of alumina, silica, germanium, carbon (e.g., carbon nanotubes, graphite, etc.), transition metal, alkaline earth metals or a mixture thereof.

In an aspect, the heat transfer system of the present invention further comprises a rectifying column for separating the low freezing component from the vapor, a condenser for condensing into a liquid state the low freezing point component removed from the heat transfer fluid, or both. In an embodiment, for example, the system further comprises a storage tank in fluid communication with the vessel, and optionally the rectifying column and condenser, for storing the removed low freezing point component. Preferably for some embodiments, the storage tank feeds or otherwise provides the removed liquid to the inlet of the heat transfer system, thereby returning the stored liquid to the heat transfer fluid upon lowering the temperature during cycling. In another embodiment, the vapor stream to the condenser additionally comprises means for removing volatile impurities on demand from the removed low freezing point component produced by decomposition of the heat transfer fluid. For example, at high temperatures volatile impurities, such as $H_2$ or hydrocarbon fragments may be produced and further removed from the removed low freezing point component vapor prior to return to the heat transfer fluid.

In an aspect, the vessel for containing the heat transfer fluid of the present invention additionally transports the heat transfer fluid and/or exchanges heat from the heat transfer fluid to a thermal reservoir, which includes, but is not limited to, heat storage systems and/or steam generators, where the heat can be stored, used to generate steam, transferred to an outside system, or combinations thereof. In a specific embodiment, the thermal reservoir thermal is a steam generator. The steam generator may further comprise a turbine, wherein the steam generator drives the turbine to produce energy. In a further embodiment, heat transferred to the thermal reservoir is stored for a period of time before being used to generate steam. For example, a portion of the heat generated and transferred to the thermal reservoir during the day may be used to immediately generate steam while the remaining portion of the heat may be stored for several hours until nighttime before being used to generate steam. In this way, the steam generator can continue to drive the turbine even when sunlight is no longer being collected. In another embodiment, the vessel additionally comprises a flash drum. This flash drum is preferably maintained at pressure that is less than the pressure of other portions of the vessel.

In a specific aspect, the heat transfer system is used in a concentrating solar power plant such as, a concentrating solar power tower, a parabolic trough solar concentrating system, a linear Fresnel solar concentrating system, and/or a solar concentrating dish system. In an embodiment of this aspect, the heat source of the present invention is solar and may be concentrated onto the vessel containing the heat transfer fluid by a reflective surface such as a parabolic trough.

The present invention provides a method for transferring heat comprising the steps of: (ii) providing a heat exchange vessel; (ii) providing a heat transfer fluid contained in the vessel, wherein the heat transfer fluid comprises a high boiling point component and a low freezing point component provides as a miscible mixture, wherein the high boiling point component and the low freezing point component each comprise one or more organic compounds; (iii) heating the heat transfer fluid; (iv) removing in a vapor state at least a portion of the low freezing point component from the heat transfer fluid upon increasing temperature of the heat transfer fluid, thus generating removed low freezing point component; and (v) adding the at least portion of the removed low freezing point component in vapor and/or liquid phases to the heat transfer fluid upon decreasing temperature of the heat transfer fluid. In an embodiment, the low freezing point component is added to the heat transfer fluid in the liquid phase. In an embodiment, the method further comprises the step of condensing the removed vapor into a liquid state, thus generating removed liquid, and wherein the adding step comprises returning at least a portion of this removed liquid back to the heat transfer fluid upon decreasing temperature of the heat transfer fluid.

As described above, the method for transferring heat of the present invention maintains the heat transfer fluid in the liquid state during temperature cycling. For example, the step of removing the low freezing point component vapor increases the boiling point of the heat transfer fluid, thereby maintaining the heat transfer fluid in the liquid state as the temperature of the heat transfer fluid increases. In a specific embodiment, the step of removing the low freezing point component vapor increases the boiling point of the heat transfer fluid to a temperature selected from the range of 300° C. to 500° C. or higher at a pressure selected over the range of 1 to 10 atmospheres, or the maximum desired operating pressure. In another embodiment, the step of adding the low freezing point component liquid decreases the freezing point of the heat transfer fluid, thereby preventing the heat transfer fluid from solidifying as the temperature of the heat transfer fluid decreases during cycling. In a specific embodiment, the step of adding the low freezing point component liquid decreases the freezing point of the heat transfer fluid to a temperature selected from the range of 0° C. to 80° C., or a temperature chosen based on the envisioned minimum ambient operating temperature.

The heat transfer fluid of the present invention is a variable composition heat transfer fluid, and in an embodiment of the present method, the adding and removing step selectively varies the mass fraction of the high boiling point component. In an embodiment, for example, the removing step increases the mass fraction of the high boiling point component. In a specific embodiment, the removing step increases the mass fraction of the high boiling point component in the heat transfer fluid from 50 to 99% (or higher). In another embodiment, the adding step decreases the mass fraction of the high boiling point component and increases the mass fraction of said low freezing point component in the heat transfer fluid. Specifically, the adding step preferably decreases the mass fraction of the high boiling point component in the heat transfer fluid from 99 to 50%.

The method of the present invention maintains the heat transfer fluid in the liquid state without exceeding the desired maximum operating pressure by varying the composition of the heat transfer fluid. For example, the adding and removing steps of the present invention vary the composition of the heat transfer fluid such that the heat transfer fluid is maintained in the liquid state within a temperature range from 5° C. to 600° C. In the context of the methods described herein, all embodiments and variations of the heat transfer fluid as described previously are applicable.

In a specific aspect of the present method the heating step comprises solar heating of the heat transfer fluid by, for example, using a concentrating solar power system. In a specific embodiment, the heating step is achieved by concentrating solar energy onto the vessel containing the heat transfer fluid by a reflective component such as a parabolic trough. In an embodiment, the method of the present invention further comprises the step of exchanging heat from the heat transfer fluid to a thermal reservoir, such as a steam generator. This method preferably comprises the additional step of driving a turbine with steam produced by the steam generator. In another aspect of the present invention, the method further comprises the step of removing volatile impurities from the removed low freezing point component, after or during the step of removing the low freezing point component. In a specific embodiment, this step comprises removing volatile impurities such as $H_2$, and hydrocarbon fragments.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

As shown in FIG. 2a, the path A-B-C-D-A shows how the x-p-T state of the working fluid would be varied during a warm-up-cool-down operating cycle.

DETAILED DESCRIPTION OF THE INVENTION

Figure 1:
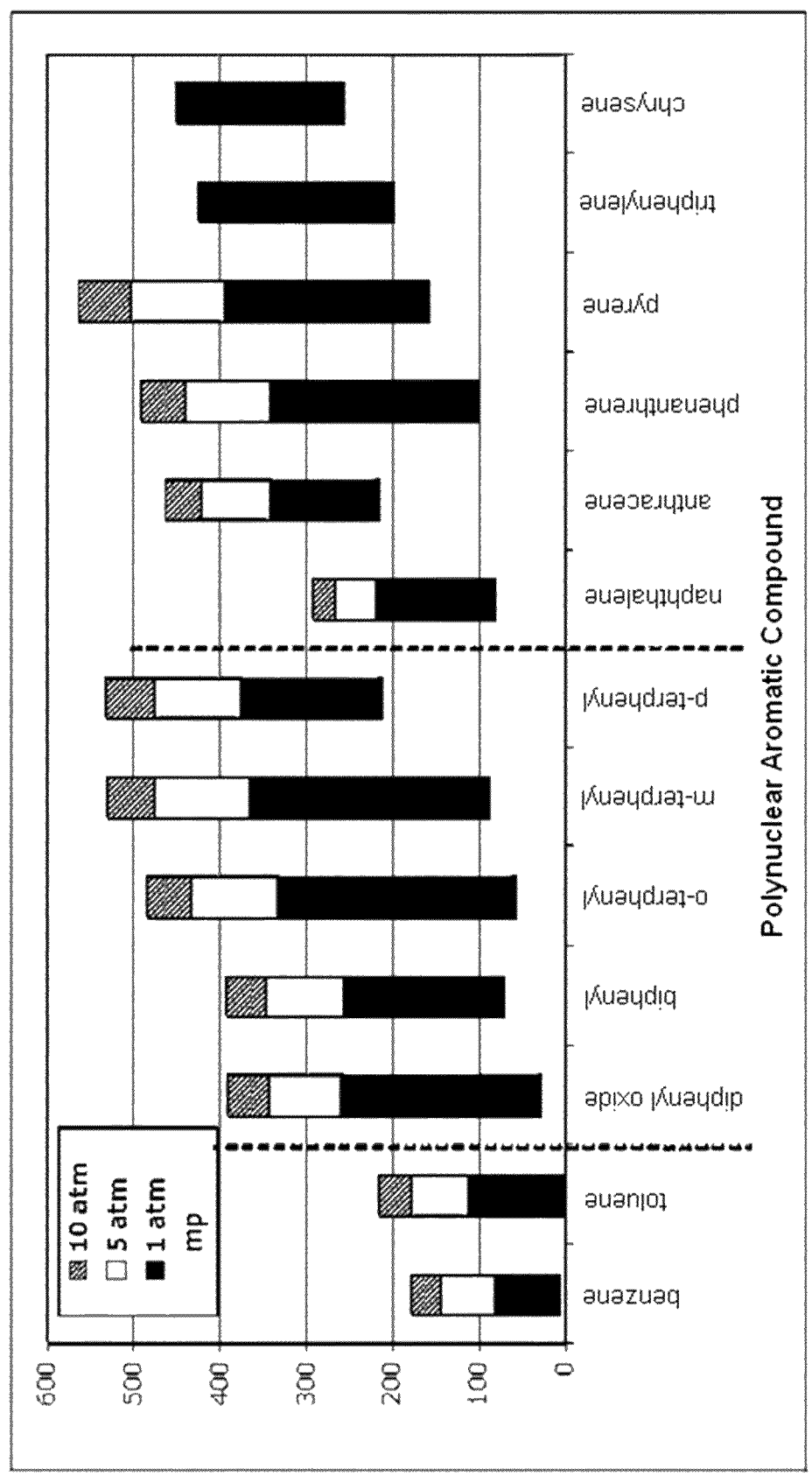
FIG. 1 provides a plot of characteristic melting and boiling point temperatures for a number of polynuclear aromatic compounds.

In general the terms and phrases used herein have their art-recognized meaning which can be found by reference to standard texts, journal references and contexts known to those skilled in the art. Referring to the drawings, like numerals indicate like elements and the same number appearing in more than one drawing refers to the same element. In addition, hereinafter, the following definitions apply and are provided to clarify their specific use in the context of the invention:

The term "concentrating solar power (CSP)" system or technologies refer to systems and technologies for generating energy utilizing concentrated solar energy. For example, solar energy is reflected by a reflective surface and is concentrated and/or focused onto a collector for absorbing the energy to be used as a heat source for a conventional power plant. In some aspects, the collector contains a heat transfer fluid for absorbing the solar thermal energy. Preferred CSP technologies include, for example, concentrating parabolic trough and linear Fresnel systems which use line focus geometry and central power tower and dish concentrating systems which use point focus geometry.

The terms "heat transfer fluid," "heat exchange fluid," "advanced heat transfer fluid" and "working fluid" are used synonymously in the present disclosure and refer to a fluid, such as a gas, liquid, or mixture of a gas and liquid, that is capable of absorbing thermal energy provided by a heat source, storing the thermal energy, and/or exchanging the thermal energy with a heat exchanger. In a specific embodiment, heat transfer fluids useful in the present invention absorb solar thermal energy and transfer the absorbed thermal energy to a steam generator. For example, the thermal energy may be used to generate steam for Rankine cycle electricity generation. Heat transfer fluids of the present invention may also transfer absorbed thermal energy to a secondary storage fluid or solid for storing the energy for later use. In some embodiments, the heat transfer fluid is thermally stable as a liquid up to 500° C. In some embodiments, the heat transfer fluid has a viscosity equal to 1 centipoise or less at 500° C. In some embodiments, the heat transfer fluid has a freezing point less than 80° C. In some embodiments, the heat transfer fluid has a vapor pressure of 5 atmospheres or less for temperatures up to 500° C. In some embodiments, the heat transfer fluid has a specific gravity selected over the range of 0.7 to 1.7 for temperatures up to 500° C. In some embodiments, the heat transfer fluid has a heat capacity selected over the range of 2-5 J/(g K) for temperatures up to 500° C. In some embodiments, the heat transfer fluid is chemically compatible with stainless steel.

The terms "vessel" and "vessel for containing said heat transfer fluid" refer to any container, chamber, tube, conduit or series of connected containers, chambers, tubes, conduits and combinations thereof able to hold the heat transfer fluid and allow the heat transfer fluid to be heated. At least a portion of the vessel is able to conduct heat to the heat transfer fluid in order to allow collected sunlight to heat the heat transfer fluid. The vessel optionally includes means, such as a pump, to circulate the heat transfer fluid through the vessel.

The terms "variable composition heat transfer fluid," "variable component heat transfer fluid" and "variable heat transfer fluid" are used synonymously in the present disclosure and refer to a heat transfer fluid comprising two or more components, the amounts of which vary with the heat transfer fluid temperature, ambient temperature, vapor pressure, and/or other preferred conditions. Preferred variable composition heat transfer fluids of the present invention comprise a high boiling point component and a low freezing point component in a miscible mixture. In an embodiment, the relative amount of the high boiling point component is varied by removing the low freezing point component from the heat transfer fluid with increasing temperature of the heat transfer fluid, and adding the low freezing point component to the heat transfer fluid with decreasing temperature of the heat transfer fluid. The low freezing point component is removed, for example, in the vapor state and returned to the heat transfer fluid in the liquid state. In other embodiments, the low freezing point component may be removed or added as a function of the vapor pressure of the heat transfer fluid. In other embodiments, the ambient temperature, time of day, stage in cycle start-up or shut-down, fluid density, heat capacity, and/or viscosity of the heat transfer fluid may determine the amount of the low freezing point component added to or removed from the heat transfer fluid.

"Boiling point" refers to the temperature at which the vapor pressure of a liquid equals the system pressure surrounding the liquid. As used herein, boiling point may be referenced to a system pressure corresponding to the operating pressure of the heat transfer system. Boiling point of a liquid is a property related to the composition of the liquid (e.g., molecular structure and relative amount of liquid components). "Normal boiling point" refers to the temperature at which the vapor pressure of a liquid equals the defined atmospheric pressure at sea level, e.g., 1 atmosphere. As used herein, boiling point may be at a system operating pressure of 5 atmospheres or another chosen level, and is not necessarily referenced to a pressure of 1 atmosphere.

"High boiling point component," "high boiling component," "component H" and "H" refers to a component of the variable composition heat transfer fluids of the present invention having a higher boiling point temperature than that of the low freezing point component, for example having a boiling point temperature a factor of 2 or greater than the low freezing point component. High boiling point components of the present invention comprise one or more organic compounds that are miscible with the low freezing point component. The high boiling point component may additionally have a larger molecular weight than the low freezing point component, for example a molecular weight a factor of two or more greater than that of the low freezing point component. In some embodiments, the high boiling point component is a solid at ambient temperature when provide alone, but is liquid at ambient temperature when provide as a miscible mixture with the low freezing point component. The high boiling component will be chosen to be chemically compatible with the low freezing point component, and may have a related or complementary molecular structure. In a specific embodiment, preferred high boiling point components of the present invention comprise one or more polynuclear aromatic compound(s) selected from the group consisting of substituted or unsubstituted diphenyl oxide, biphenyl, o-terphenyl, m-terphenyl, p-terphenyl, anthracene, phenanthrene, pyrene, triphenylene, chrysene, perylene, coronene, and benzopyrene.

"Low freezing point component", "low freezing component," "component L" and "L" refers to a component of the variable composition heat transfer fluids of the present invention having a lower freezing point temperature than that of the high boiling point component, for example having a freezing point temperature a factor of 2 or lower than that of the high boiling point component. Low freezing point components of the present invention comprise one or more organic compounds that are miscible with the high boiling point component. The low freezing point component may additionally have a smaller molecular weight than that of the high boiling point component, for example a molecular weight a factor of two or more less than that of the high boiling point component. The low freezing point component will be chosen to be chemically compatible with the high boiling component, and may have a related or complementary molecular structure. In a specific embodiment, preferred low freezing point components of the present invention comprise one or more aromatic compound(s) selected from the group consisting of substituted or unsubstituted benzene, toluene, diphenyl oxide, biphenyl o-terphenyl, m-terphenyl, and naphthalene. In other embodiments, low freezing point components may comprise one or more polysiloxanes.

The term "freezing point" refers to the temperature at which a liquid of specified composition solidifies under a specified pressure. In some embodiments, the freezing point refers to the temperature at which a liquid of specified composition solidifies under the operating pressure of the heat transfer system. Freezing point of a liquid is fairly insensitive to pressure over the narrow ranges used here, but some slight variation may be expected and accounted for. Freezing point of a liquid is a property more strongly related to the composition of the liquid (e.g., molecular structure and relative amount of liquid components). As used herein, freezing point is not necessarily referenced to a pressure of 1 atmosphere.

The term "organic compound" refers to chemical compounds comprising carbon, such as a substituted and/or unsubstituted hydrocarbon. Organic compounds may comprise additional elements, such as oxygen, nitrogen, silicon, chlorine, bromine, sulfur, iodine, etc. Organic compounds for use in heat transfer fluids of the present invention are preferably selected from: poloynuclear aromatic, poly-phenyl, heterocyclic, substituted aromatic, perfluorinated ring, polysiloxanes and aromatic silane compounds. Preferred heat transfer fluids of the present invention comprise a mixture of organic compounds, wherein the high boiling point component comprises at least one organic compound and the low freezing point component comprises at least one organic compound.

Substituted compounds include those which are substituted with alkyl, alkenyl or aryl groups, which in turn can be further optionally substituted. Substituted compounds also include halogenated or semihalogenated compounds, such as compounds having one or more hydrogens replaced with one or more fluorine atoms, chlorine atoms, bromine atoms and/or iodine atoms. Substituted compounds can have a boiling point or freezing point which differs from the boiling point or freezing point of the unsubstituted compound and other substituted compounds. In some embodiments, the high boiling point component and the low freezing point component may be from the same class of compounds (e.g., both may be differently substituted biphenyl compounds) as long they provide a miscible mixture and there is sufficient difference between their boiling points or freezing points.

The term "alkyl" includes straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, or 7-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups.

The term "alkenyl" includes straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenylgroups can also carry alkyl groups. Cycloalkenylgroups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

The term "aryl" includes groups having one or more 5-, 6- or 7-member aromatic and/or heterocyclic aromatic rings. The term heteroaryl specifically refers to aryl groups having at least one 5-, 6- or 7-member heterocyclic aromatic rings. Aryl groups can contain one or more fused aromatic and heteroaromatic rings or a combination of one or more aromatic or heteroaromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those which are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-membered ring and one or more additional five- or six-membered aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

The term "heterocyclic" refers to ring structures containing at least one other kind of atom, in addition to carbon, in the ring. Examples of such atoms include nitrogen, oxygen and sulfur. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "aromatic" refers to compounds comprising aromatic hydrocarbon rings, optionally including heteroatoms or substituents. Preferred aromatic compounds useful in the present invention include benzene, toluene, biphenyl, o-terphenyl, m-terphenyl, p-terphenyl, naphthalene, anthracene, phenanthrene, pyrene, triphenylene, and derivatives thereof.

As to any of the groups described herein which contain one or more substituents, it is understood that such groups do not contain any substitution or substitution patterns which are sterically impractical and/or synthetically non-feasible. Optional substituents includes substitution with one or more of the following substituents, among others:

halogen, including fluorine, chlorine, bromine or iodine; pseudohalides, including —CN;
—COOR where R is a hydrogen or an alkyl group or an aryl group and more specifically where R is a methyl, ethyl, propyl, butyl, or phenyl group all of which groups are optionally substituted;
—COR where R is a hydrogen or an alkyl group or an aryl group and more specifically where R is a methyl, ethyl, propyl, butyl, or phenyl group all of which groups are optionally substituted;
—CON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—OCON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—N(R)$_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;
—SR, where R is hydrogen or an alkyl group or an aryl group and more specifically where R is hydrogen, methyl, ethyl, propyl, butyl, or a phenyl group, which are optionally substituted;
—SO$_2$R, or —SOR where R is an alkyl group or an aryl group and more specifically where R is a methyl, ethyl, propyl, butyl, or phenyl group, all of which are optionally substituted;
—OCOOR where R is an alkyl group or an aryl group;
—SO$_2$N(R)$_2$ where each R, independently of each other R, is a hydrogen, or an alkyl group, or an aryl group all of which are optionally substituted and wherein R and R can form a ring which can contain one or more double bonds and can contain one or more additional carbon atoms; and
—OR where R is H, an alkyl group, an aryl group, or an acyl group all of which are optionally substituted. In a particular example R can be an acyl yielding —OCOR" where R" is a hydrogen or an alkyl group or an aryl group and more specifically where R" is methyl, ethyl, propyl, butyl, or phenyl groups all of which groups are optionally substituted.

The term "ambient temperature" refers to the average temperature of the area and/or atmosphere surrounding a heat transfer system and/or heat transfer fluid of the present invention. For example, ambient temperature refers to the average outdoor daytime or nighttime temperature. Ambient temperature may also refer to room temperature. In an embodiment, ambient temperature is 0° C.-30° C., or in some embodiments 10° C.-30° C., or in some embodiments 20° C.-30° C.

"Thermally stable" refers to a property of a material representing its ability to resist substantial degradation and/or decomposition at a specific temperature, such as temperatures over the range of 300-600° C. For example, a material is thermally stable at a specific temperature if its decomposition rate is less than 0.1% mole per hour. A heat transfer fluid of the present invention is preferably thermally stable up to at least 500° C.

As used herein the terms "gas" and "vapor" are used interchangeably and refer to a gas phase state of matter.

The invention provides a novel heat transfer fluid that uses mixtures with varying compositions at different times and operating temperatures that permits the mixture to have desirable liquid properties over a wider operating temperature range than existing fluids of fixed composition. The temperature ranges and fluid properties of interest are those suited for advanced parabolic trough solar power plants. Systems of the present invention involve careful choice of fluid mixture components, as well as a prescription for cyclical variation of the mixture composition, modifications of solar-collector flow loop equipment, and associated control strategy for safe, reliable, semi-automatic operation of the cycle.

Advanced heat transfer fluid (AHTF) compositions of the present invention comprise: (i) a chemical or mixture labeled component H, chosen to have desirable properties such as desirable thermal, transport and stability properties, and low vapor pressure for use at high operating temperature; and (ii) varying amounts of a related chemical labeled component L that has a low molecular weight, a low freezing point, is chemically compatible with component H, and produces a mixture with component H that remains liquid well below the solidification temperature of component H alone. Component L may be added to component H when the system is at reduced temperatures. Additionally, flow loop modifications and system control strategies may add or remove component L as needed for stable operation during varying solar flux collection with the daily operation of a concentrating solar power plant. An initial pair of compounds for the H/L pair is presented here in detail, however many other H/L pairs are possible using alternative chemistries. The liquid mixtures of the present invention may be applicable for use in heat exchange systems for parabolic troughs (solar heat collecting devices) in solar power plants, and other applications for use as heat exchangers.

The present invention comprises a novel process and system for extending the temperature ranges of liquid heat transfer. Low molecular weight fluids remain liquid at low temperatures but evaporate quickly at high temperatures, and high molecular weight fluids remain liquid at high temperatures but solidify at lower temperatures. The present invention may involve the use of a mixture of high (H) and low (L) molecular weight fluids for heat exchange. As the mixture heats up, component L evaporates and the vapor is removed from the mixture leaving the heated fluid mostly component H. Optionally, as it is removed component L is condensed back into the liquid phase. As heated component H is cooled after undergoing heat exchange, liquid L is added to the mixture to prevent component H from solidifying as the fluid cools. The liquids are miscible, and the mixture remains liquid at low temperatures (such as when the sun goes down). In an embodiment, the rate of evaporation of component L and subsequent loss of volume of the H/L mixture accommodates the increase in pressure due to heating H, so the system is substantially void of significant pressure issues. In another embodiment, the use of an inert gas, such as a blanket of nitrogen, further compensates for volume and pressure issues that could arise from removal, condensation, and addition of L. The present invention includes use of a mixture of chemical components that remain liquid over a wide operating range, as well as a process and operation strategy that produces the desired behavior at all conditions in this range. As used herein, the mixture may comprise a combination of two components: (i) component H, a high-molecular weight, high-boiling point substance, that resists decomposition and is stable at elevated temperature; and (ii) component L, a low-molecular weight, low-freezing point substance. These are chosen to be compatible and miscible in the liquid phase over the range of temperatures and pressures of interest. The mixture is provided at a composition that is liquid at ambient temperature (although component H alone may be solid at ambient temperature). As the mixture is heated and the vapor pressure of component L rises, component L is removed continuously or at discrete intervals through a relief valve or other exit at a selected pressure, and preferably condensed into a storage tank for later reuse. In an embodiment, at the upper operating temperature, the heat transfer fluid may be enriched in component H to the point that the heat transfer fluid may consist essentially of component H, and the viscosity, vapor pressure, boiling point, and heat transfer properties approach those of pure component H. When the heat source is removed and the heat transfer loop begins cooling the heat transfer fluid, component L is added in the liquid state to the fluid loop at suitable temperature and pressure to prevent component H from solidifying as it cools. In an embodiment, adding component L in the liquid state to the fluid loop may comprise returning the removed component L that is condensed and stored in a storage tank. This removal and addition of component L may be accomplished by passive relief valves operating in response to system pressure, and/or by more active control systems, as desired.

In an embodiment, the variable-composition heat transfer fluid comprises component H, wherein component H may comprise: meta-terphenyl; mixtures of terphenyls and/or quatraphenyls and higher polyphenyls; polynuclear aromatic compounds, such as dinaphthyl, pyrene, benzopyrenes, phenanthrene, and triphenylene; and mixtures thereof. Component L may comprise: benzene; toluene; other low-molecular weight species compatible with the larger aromatic species present in component H; and mixtures thereof.

In certain heating applications, it is an advantage for a heat transfer fluid to be usable over a wide temperature range. For example, in a concentrating solar power plant, the working fluid is raised to the maximum of its working range by the collection mirrors, and then used to generate steam that is used to turn electrical generators. The efficiency of conversion of heat to electricity is improved by operating at the highest practical temperature. However, the working fluid may cool off at night or when not being circulated, and it is desirable for the heat transfer fluid to remain liquid for ease of startup when operation resumes. Thus, heat transfer systems for such applications preferably comprise a heat transfer fluid that remains liquid at ambient conditions and has an upper operating temperature limit determined by vapor pressure or decomposition temperature of the fluid. In current practice, the eutectic mixture of biphenyl and diphenyl oxide is preferred because of its operating range of 12-400° C. Other high-temperature heat transfer fluids such as molten salts or liquid metals have higher operating temperatures but have unsatisfactory lower temperature limits and/or safety and ease-of-use issues.

Variable-composition heat transfer fluids and heat transfer systems of the present invention preferably increase the useful maximum temperature in a concentrating solar power plant above 400° C., and certain compositions and systems may increase the useful maximum operating temperature up to or above 500° C. Such an increase could raise the thermal efficiency of the electrical generation from 37% to 41%, and/or increase the electrical output of the plant by about 10% compared to present heat transfer fluids. A small increase in plant construction cost for implementing the systems and/or heat transfer fluids of the present invention would likely be offset by the increased electrical generation. Improved economics of this renewable energy production technique will increase its use.

The present invention provides a variable composition heat transfer fluid for improving the performance of heat exchange systems, such as concentrating solar power plants.

EXAMPLES

Description and Technical Approach

Advanced Heat Transfer Fluid Specification

Because of the high heat flux at the receiver surface, vapor-phase and boiling heat transfer fluids are not favored for heat collection at the focus of a concentrating solar power collector. In consideration of the range of operating conditions envisioned for solar power collection, the following properties are desirable for a condensed-phase heat transfer medium:
- thermal stability as a liquid up to temperatures near 500° C.;
- vapor pressure of about 5 atmosphere up to temperatures near 500° C.;
- freezing point less than 80° C.;
- specific gravity in the range of 0.7-1.7 to about 500° C.;
- heat capacity in the range of 2-5 J/g/K to about 500° C.;
- viscosity of about 1 centipoise to about 500° C.; and
- chemical compatibility with common stainless steels.

For application in a power tower, the upper temperature target is raised to 600° C. and the freezing-point target is relaxed to near 20° C., depending on energy storage capabilities. Environmental safety and toxicity health standards are also a factor in evaluation.

Meeting these property goals with organic fluids requires definite advances beyond the current biphenyl/diphenyl oxide eutectic. These compounds have similar vapor pressure and boiling point behavior, with normal boiling points of 256-259° C. and a 5 atmosphere boiling points of 342-345° C. Any mixture will also have a boiling point in the narrow range between the two pure components. The individual compounds have freezing points of 71 and 27° C.; the eutectic mixture at a fixed composition of about 26.5% biphenyl/73.5% diphenyl oxide has a minimum freezing point of 12° C. Using this as a base-case comparison, raising the upper operating temperature requires improving properties such as thermal stability and vapor pressure, while avoiding unduly raising the freezing point. The viscosity criterion bears attention; the viscosity of the biphenyl/diphenyl oxide eutectic mixture varies from 5 cP at 15° C. to 0.12 cP at 400° C., and other, wider-range constant-composition organics would be expected to have even more variation if they exhibit the usual exponential dependence on temperature over a wider service range. Other criteria (density, heat capacity, chemical compatibility) should be readily achievable by most organic systems.

Extending the Range

An object of the present invention is to extend the operating range to higher temperatures, while still having fluid flow when the system cools to ambient temperature. Useful high-temperature stability for organic compounds is expected for aromatic compounds, such as poly-phenyls and polynuclear aromatics (PNAs). Other classes of very stable compounds include heterocycles, some substituted aromatics, perfluorinated ring compounds, and aromatic silanes (Johns et al., 1962; 1962a). Several compounds in these families of aromatic hydrocarbons are shown below.

Families of related aromatic structures

benzene

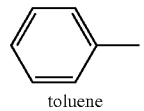

toluene

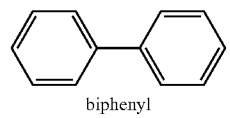

biphenyl

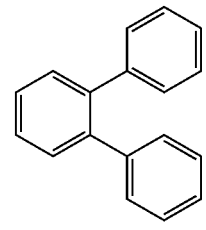 [SMILES: c1ccc(-c2ccccc2-c2ccccc2)cc1]

o-terphenyl

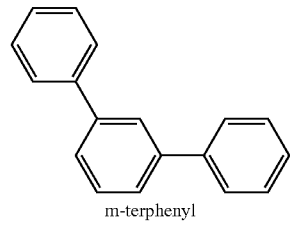

m-terphenyl

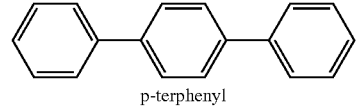

p-terphenyl

naphthalene

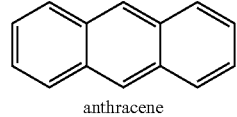

anthracene

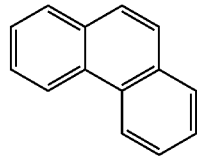 [SMILES: c1ccc2c(c1)ccc1ccccc12]

phenanthrene

Families of related aromatic structures

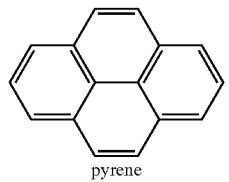

pyrene

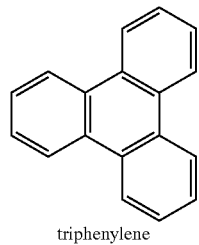

triphenylene

For each family of related compounds, both the freezing and boiling temperatures increase with molecular weight, so higher-molecular weight compounds have a lower vapor pressure at a fixed temperature, allowing use at higher temperatures, but also may have an undesirably higher melting/freezing temperature. FIG. 1 illustrates the melting points, boiling points at a pressure of 1 atm, and high-pressure boiling temperatures for several families of related aromatic hydrocarbons. In addition to the boiling point and freezing point of a compound, viscosity is another important consideration. The biphenyl/diphenyl oxide eutectic mixture has a viscosity of 0.12 cP at 400° C. to 5.0 cP at 15° C. This factor of 40 increase on cooling to lower temperature is typical of the exponential increase observed for liquids (Bird, 2006). For fluids of higher molecular weight, simple modeling predicts that the viscosity may be an acceptable fraction of 1 cP at the upper operating temperature but could increase by a factor of 50 or more even if it remained liquid on cooling from 500° C. to 50° C. Thus, a constant-composition fluid, such as the biphenyl/diphenyl oxide eutectic mixture, would inherently create difficulties for maintaining circulation over the full operating temperature range.

Any of the three terphenyl isomers boils well above biphenyl; indeed, a mixture of terphenyls and higher polyphenyls is available as Therminol 75 (Solutia). This mixture is useful because its vapor pressure is lower than that of Therminol VP-1, but it has the drawback that it solidifies at 80° C. Therefore, in an embodiment the heat transfer fluid comprises a mixture of related, compatible compounds. The heat transfer fluid of the present invention preferably comprises: (i) component H, chosen for desirable high-temperature behavior, which is preferably a high-molecular weight, high-boiling, and/or very thermostable compound or mixture of such compounds; and (ii) component L, which preferably comprises one or more low-molecular weight relative(s) of H that is widely miscible in the liquid phase and can be used to produce a mixture having a freezing point below that of component H alone. The composition of this mixture varied actively during service of a heat transfer system, to produce a fluid with properties not achievable with a fluid of fixed composition. This composition variation may be accomplished by several techniques, but in consideration of the great difference in vapor pressure of the two components, the preferred technique involves removing L vapor during heating and adding liquid L during cooling.

In this way, the variable-composition heat transfer fluid of the present invention allows access to desirably lower freezing-points by decoupling the freezing point of the mixture from the undesirably high freezing point of the H component. This approach permits further access to many high-molecular-weight compounds having desirable high-temperature properties, but that have been previously excluded primarily based on the undesirably high freezing points.

Figure 2A:
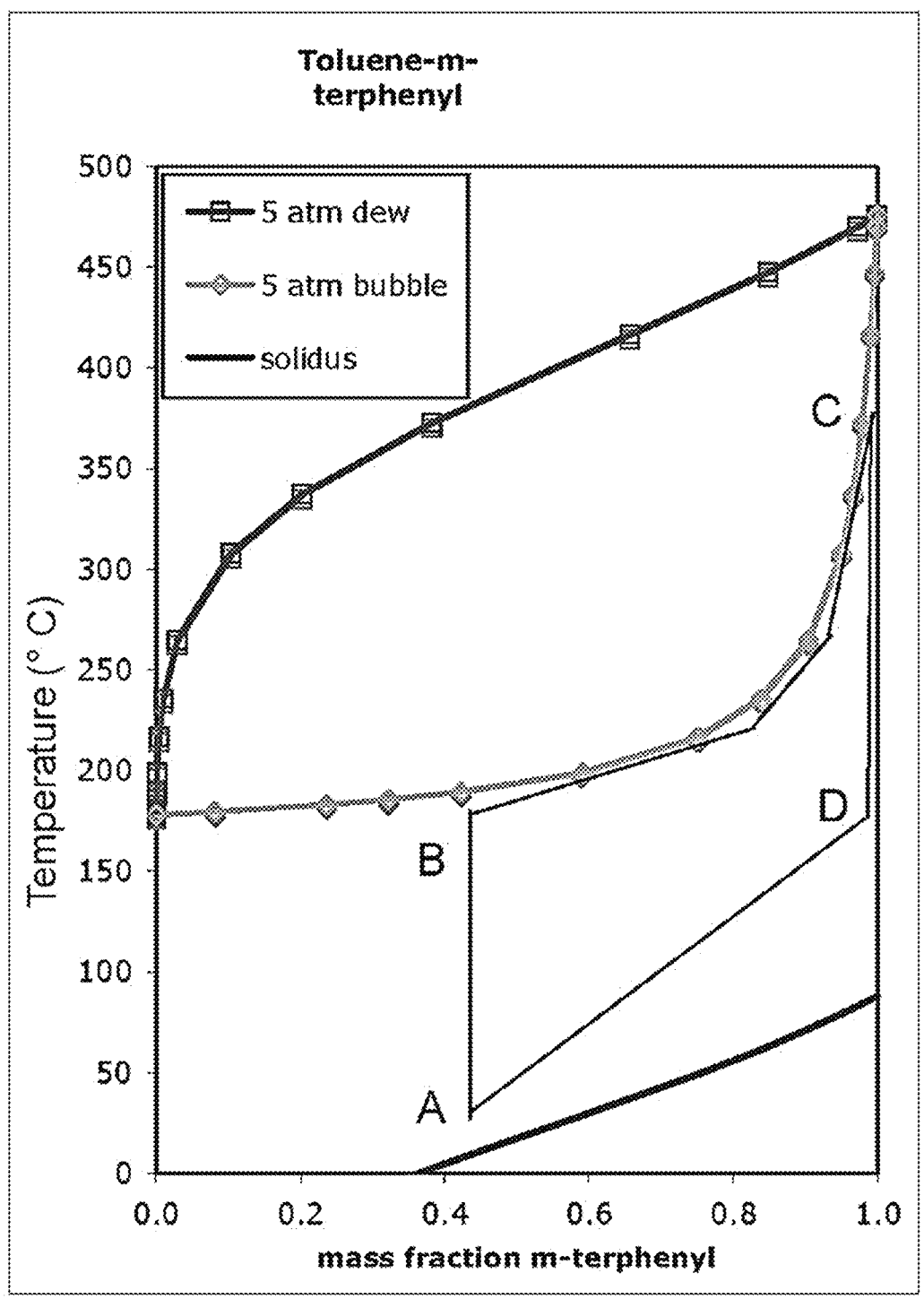
FIGS. 2a-2d provide an ideal phase diagram for a toluene-m-terphenyl mixture (FIG. 2a), a naphthalene-pyrene mixture (FIG. 2b), a benzene-pyrene mixture (FIG. 2c), and a benzene-naphthalene mixture (FIG. 2d). Temperature (° C.) is plotted as a function of the mass fraction of the higher boiling point component m-terphenyl (FIG. 2a), pyrene (FIG. 2b), pyrene (FIG. 2c) and naphthalene (FIG. 2d).
Figure 2B:
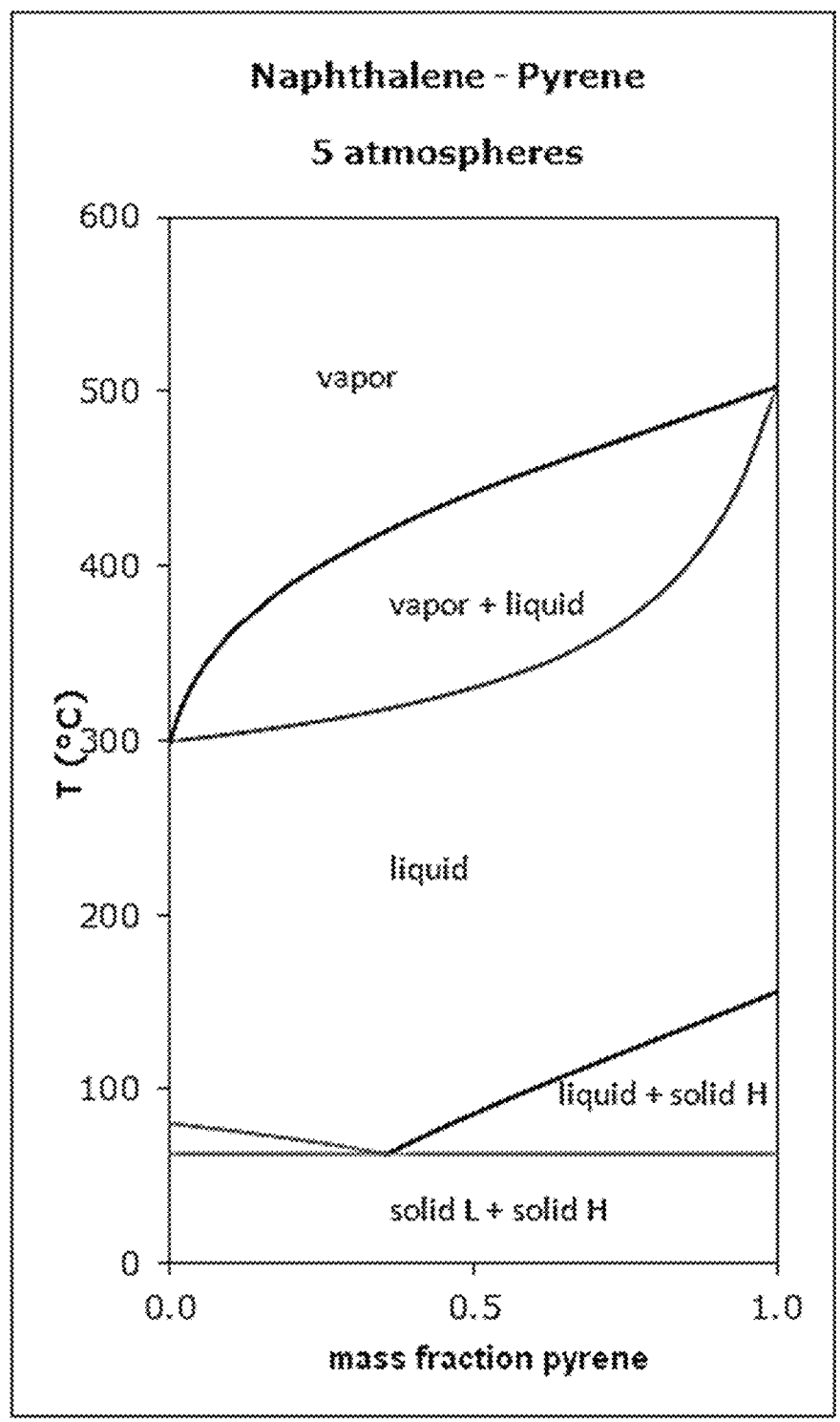
Figure 2C:
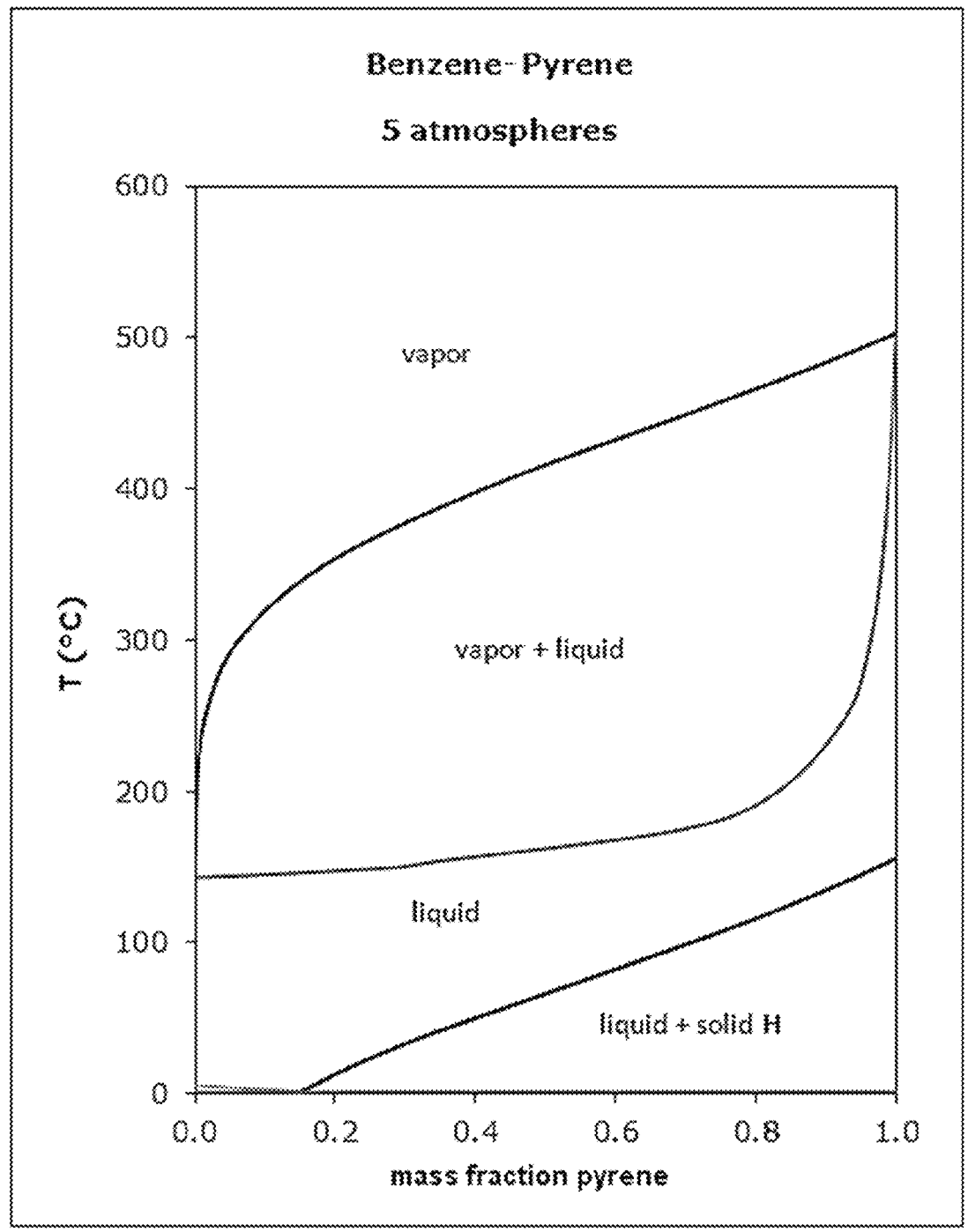
Figure 2D:
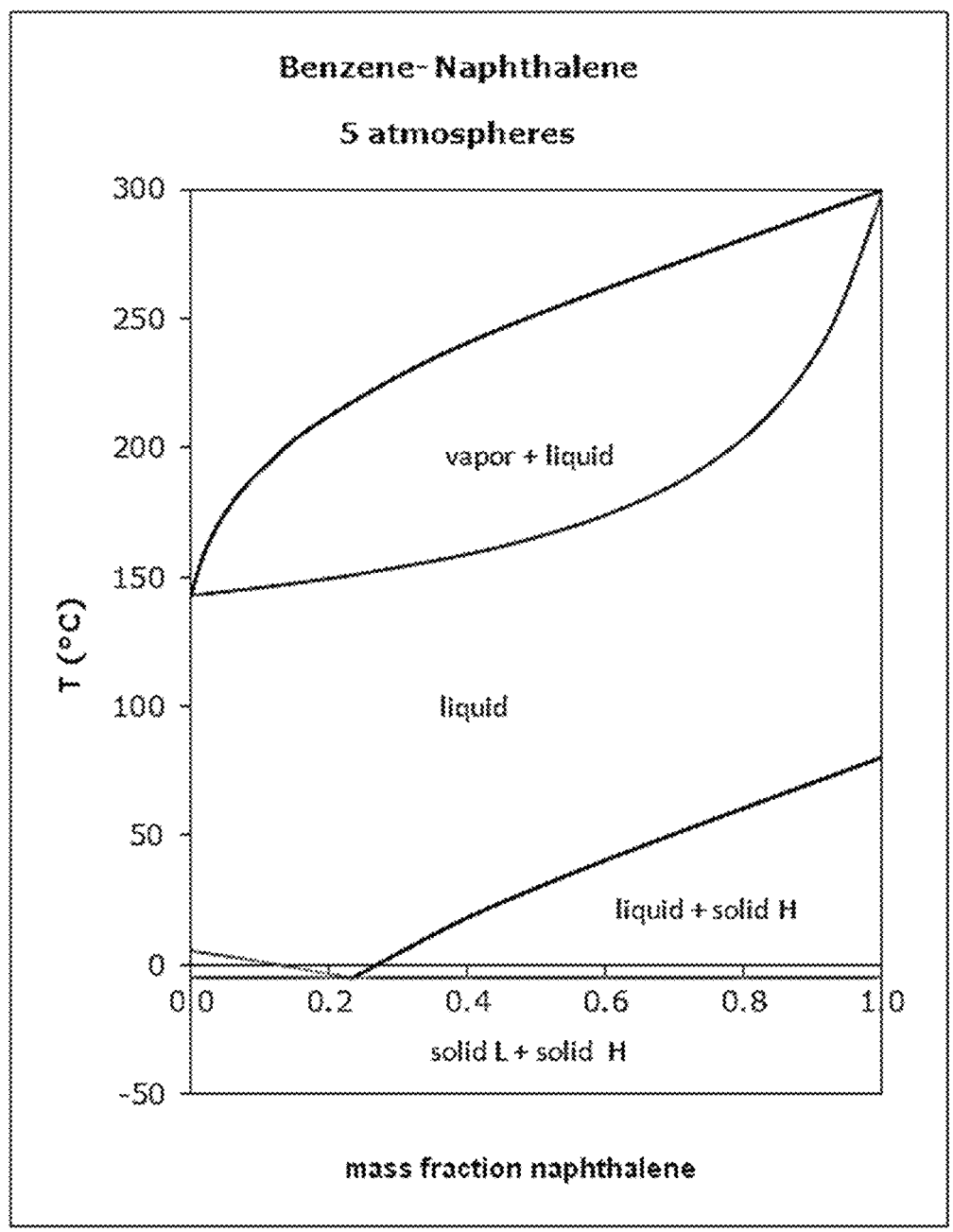

FIGS. 2a-2d show ideal phase diagrams for low freezing point component and high boiling point component mixtures of the present invention, namely toluene-m-terphenyl (FIG. 2a), naphthalene-pyrene (FIG. 2b), benzene-pyrene (FIG. 2c), and benzene-naphthalene (FIG. 2d). Temperature (° C.) is plotted as a function of the mass fraction of the higher boiling point component. As referred to in the figures, "solid L" refers to the presence of the solid low freezing point component and "solid H" refers to the presence of the solid high boiling point component. As illustrated in these figures, the boiling point and freezing point of the mixture can be significantly altered by adjusting the amount of the low freezing point component in the mixture.

The cyclic change in composition and properties is illustrated with the sample mixtures shown in FIG. 2a. The present example demonstrates a heat transfer fluid of the present invention comprising terphenyl for component H, and toluene, a good low-boiling relative, for component L. For simplicity in prediction of the phase behavior, m-terphenyl was used in the present example. FIG. 2a provides a simplified phase diagram for this mixture, incorporating the known pure-component phase transitions and calculating the solid-liquid and liquid-vapor coexistence lines using ideal solution theory. It should be noted that these aromatic compounds are nearly ideal. Using the same models, it was predicted the biphenyl-diphenyl oxide eutectic to be at 14° C. and 26% biphenyl, or within 2° C. and 2% of the experimentally observed conditions. The proposed variations in composition as a function of operating temperature are displayed on the phase diagram. In an example heat transfer system, such as a concentrating solar power plant, a heat transfer fluid mixture of 50 wt % terphenyl and 50 wt % toluene starts the cycle at or near ambient temperature in the morning at point A. As incident sunlight warms the solar collector holding the heat transfer fluid, the fluid temperature rises until it reaches the mixture boiling point, at B. FIG. 2a shows the vapor-liquid coexistence curves for a pressure of 5 atm, however other choices for the operating pressure may be desirable. Toluene-rich vapor can be removed continuously with the continued rise in temperature, leaving the remaining fluid increasingly richer in m-terphenyl.

Figure 3:
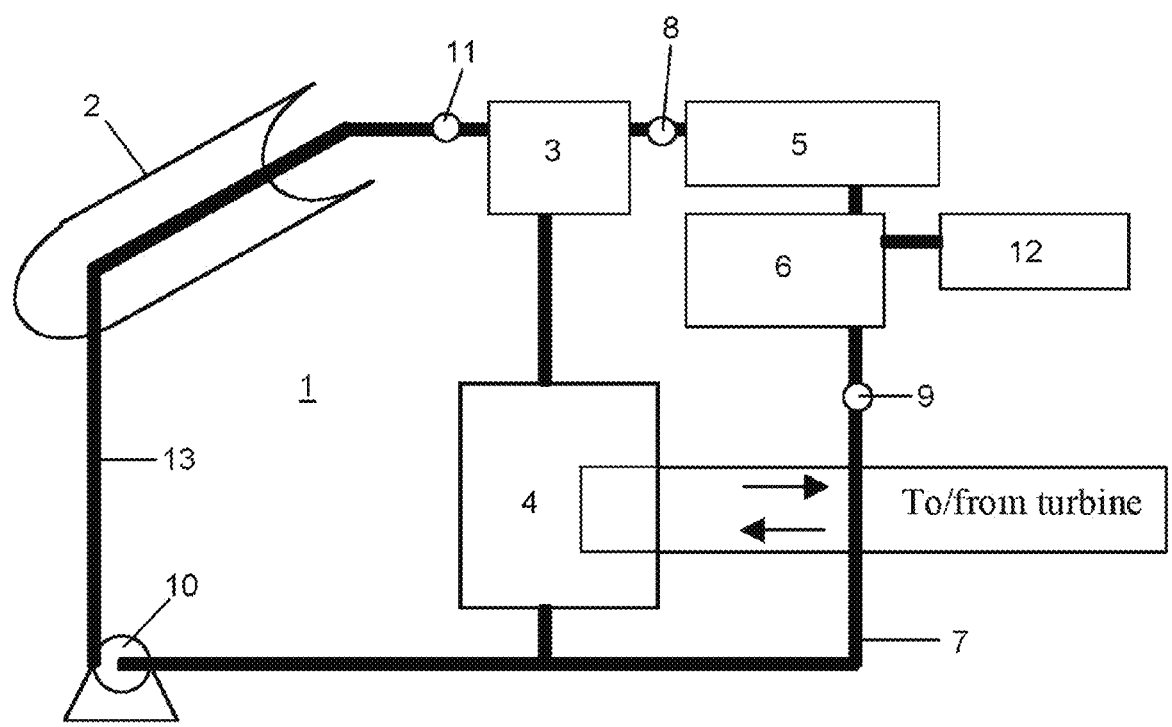
FIG. 3 shows a schematic diagram of a heat transfer system of the invention having a variable composition heat transfer fluid. Included is a relief valve, condenser, and a storage tank for removing, condensing and storing the low freezing point component during the cycle.

An exemplary heat transfer system of the invention is shown in FIG. 3, which illustrates a circulatory loop 1 comprising receiver tubes 13 containing the heat transfer fluid, a solar collector 2 (e.g. a parabolic mirror) able to receive sunlight and heat the fluid in the receiver tubes 13, a steam generator 4 operably connected to a turbine (not shown), and a circulation pump 10 able to circulate fluid through the circulatory loop 1. In a preferred embodiment, the toluene-rich vapor may be created in a flash drum 3 between the collector 2 and a steam generator 4. This flash drum is preferably kept at a slightly lower pressure than the receiver tubes 13 to prevent undesirable boiling in the tubes. Removal of toluene (or another low-molecular weight component) vapor may be controlled by a pressure-sensitive relief valve 8 between the flash drum 3 and a condenser 5. The removed toluene vapor may be condensed continuously and the condensate may additionally be stored in a separate storage tank 6 for later reuse.

As illustrated in FIG. 2a, the working fluid progresses up the bubble-point line to progressively higher temperatures as the toluene is removed, until the system reaches the designed operating temperature at point C. At this point, the mixture consists essentially of nearly pure terphenyl. In the evening, when the solar input decreases, the fluid cools down. When the temperature is still above the terphenyl freezing point and the vapor pressure drops to a chosen value, such as 1.5 atm as shown by point D, toluene liquid is returned to the mixture in the circulatory loop 1 to depress the freezing point of the mixture below that of m-terphenyl. The composition then gradually returns to the starting mixture with continued cooling to point A. As shown in FIG. 3, toluene can be added to the circulation loop 1 through return line 7. The addition of toluene may be controlled by a pressure-driven reintroduction valve 9 between the toluene storage tank 6 and return line 7. In additional embodiments, more active control strategies, such as computerized valves, could allow for selection of more complex time-temperature-pressure-composition pathways. An additional access valve 11 is optionally present at some point along the circulatory loop 1 to provide access to the heat transfer fluid or to remove any impurities present in the circulatory loop 1. Additionally, a supplemental reservoir 12 may be used to store and introduce materials, such as additional volume of the low-molecular weight component or inert materials (e.g. nitrogen gas) to regulate the volume or pressure in the system.

Figure 4:
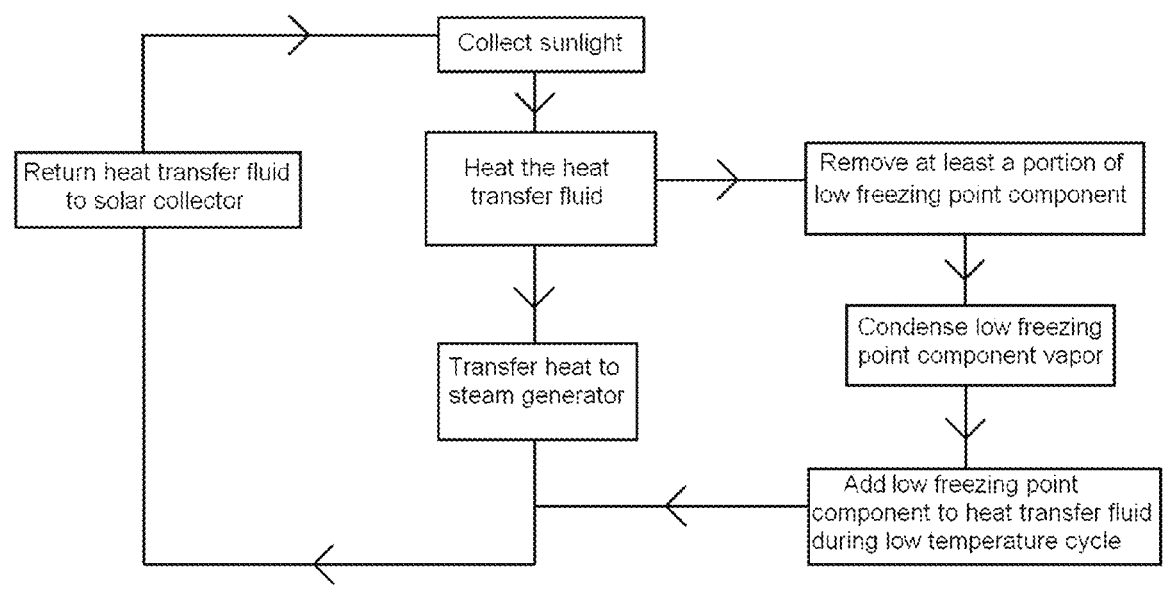
FIG. 4 shows a flow diagram of an exemplary method of the present invention comprising heating the heat transfer fluid, removing at least a portion of the low freezing point component from the heated heat transfer fluid, transferring the heat transfer fluid to a steam generator, and returning a portion of the condensed low freezing point component back to the heat transfer fluid.

FIG. 4 shows a flow diagram of an exemplary method of the present invention. As illustrated in FIG. 4, sunlight is collected and used to heat the heat transfer fluid. The heat transfer fluid is transferred to a steam generator where the heat is used to generate steam. The heat transfer fluid is then returned to the solar collector. When the fluid reaches a temperature where the vapor pressure approaches the maximum operating pressure, at least a portion of the low freezing point component is then removed from the heated heat transfer fluid to raise the fluid boiling temperature and decrease the fluid vapor pressure to remain within the desired operating conditions. The removed low freezing point component vapor is condensed for temporary storage, and returned to the heat transfer fluid during a low temperature cycle to prevent the working fluid from reaching the liquid-solid equilibrium line. The heat transfer fluid may heated, used to transfer heat to the steam generator, and returned to the solar collector multiple times before the system enters a low temperature cycle and the low freezing point component is returned to the heat transfer fluid.

A variable-composition heat transfer fluid of the present invention may comprise a variety of operating fluid combinations. The major benefit of the present heat transfer fluid arises from uncoupling the solidification, freezing, or melting temperature of the mixture from the high temperature properties of component H. This additional freedom allows access to many high-molecular-weight compounds that are better candidates for the high temperature thermal stability and low vapor pressure needs of advanced heat transfer fluid applications and systems. In addition, the use of a variable-composition mixture adds design flexibility and some complexity to practical implementation. Some issues affecting system operation, robustness, and safety to be considered include:

1. Removal of volatile impurities: Low-molecular-weight species produced by heat transfer fluid decomposition from local overheating, etc. may cause increased operating pressure and, in the case of hydrogen, can embrittle the steel and lead to failure. Therefore, it may be desirable to remove these low-molecular-weight species. The variable-composition operating system of the present invention involves vapor removal and an opportunity for purging undesirable components on each thermal cycle. Therefore, in an embodiment, the system and method of the present invention may comprise an additional component or step for the removal of $H_2$ and other volatile impurities in the flow diagram (FIG. 3), maintaining the fluid near optimal condition.

2. Additives: Cyclic variation of mixture composition also provides the possibility of introducing additives to control fluid properties during different portions of the cycle. Such additives could be selected to decrease viscosity of the cold fluid, to remove radicals from decomposition and prevent chain reactions, etc. These additives would be selected to be removed with the low-freezing component when the system heats up, since such additives may not have the high-temperature stability of the high boiling point component. The additives would be returned to the system with the low-freezing component when the system temperature decreases and would exert their impact during low temperature circulation or storage. Any such additives would also have the effect of decreasing the freezing point of the mixture by diluting the high boiling component, and so would decrease the amount of low-freezing component needed to achieve the desired low temperature operation. Thus, the purity of the low-freezing component is not critical provided any impurities behave similarly in the operating cycle so as not to present problems during high-temperature portions of the cycle.

3. Volume changes during the cycle: Adding and removing mass under pressure during the operating cycle may necessitate manipulating the volume under pressure control. This is already an issue in the prior art; the biphenyl\diphenyl oxide mixture currently in use experiences a 25% decrease in density between the lower and upper operating temperatures. This thermal expansion of the heat transfer fluid greatly exceeds that of the piping and tanks used in many heat transfer system, thus expansion tanks, nitrogen blanket gas, and system breathing are utilized in current concentrating solar power plants. In the variable-composition heat transfer system or method of the present invention, the removal of component L decreases the remaining mass of the mixture, acting in the opposite direction of the density change. Details of volume management and pressure control will depend on the temperature-composition-density characteristics of the advanced heat transfer fluid mixture.

Implementation

In an embodiment, implementation of the variable-composition heat transfer fluid of the present invention may include: selection of improved mixtures; determination of suitable operating cycles and equipment modifications; and quantification of the impact on overall solar power collection efficiency. More detail on the focus and activities in each of these areas is described below.

Selection of Wide-Operating-Range Chemical Systems

The H/L mixture heat transfer fluids of the present invention are selected by considering a variety of promising component candidates. This operating strategy uncouples the high-temperature vapor pressure and stability requirements from the low-temperature freezing point and viscosity criteria, so many compounds that are individually unsatisfactory may be part of mixture pairs that will be potential advanced heat transfer fluids.

High-temperature heat transfer liquids are usually drawn from aromatic organic compounds, molten metals, or molten salts. Molten alloys of sodium and potassium have excellent high-temperature properties and can remain liquid to ambient and below. However, they create containment issues in both the heat collection system and the steam generator exchanger. For reasons of practicality and safety at both high and low temperatures, molten metals are not considered as a desirable component for the heat transfer fluid of the present invention. Molten salts have virtually no vapor pressure and are excellent high-temperature heat transfer media, but usually have unacceptably high freezing temperatures. The eutectic mixture of sodium nitrate, sodium nitrate, and potassium nitrate (labeled Hitec salt) has the particularly low freezing point of 142° C. when fresh, but even this is too high for parabolic trough applications. A strategy for preventing solidification of molten salts by careful addition of water while cooling has been considered by Payne (U.S. Pat. No. 2,910,244) for maintaining the liquid state to lower temperature. However, water content in the hot salt accelerates decomposition of the eutectic anions and leads to formation of metal hydroxides, oxides, and carbonates that shorten the salt service life. Careful protocols for water removal while reheating the salt to its normal operating range (Singh, 1985) emphasize deliberate steps at low temperature to avoid foaming or steam explosions; this system is therefore not suited to the diurnal temperature variation characteristic of parabolic power trough collectors.

Organic systems hold more promise for operation from ambient to 500° C. or above. For a chosen family of related structures, the vapor pressure decreases (the boiling point rises) as the molecular weight increases (as shown in FIG. 1). Stability against thermal decomposition depends on the chemical bonding. For example, highly functionalized molecules may have facile rearrangements and bond scission, and aliphatic compounds suffer bond scission at lower temperatures, while aromatic compounds and heterocyclic compounds have higher activation energies for decomposition (Johns et al., 1962). The activation energy for bond scission and free radical formation should preferably not be lower than the bond energy of the weakest bond in the compound. Thus, terphenyls may have the same thermal stability as biphenyl, but they have higher boiling points and thus reduced vapor pressure at the highest service temperatures. Ring structures can be self-healing after scission of an individual bond to form a pair of linked radicals, so polynuclear aromatic compounds (PNAs) such as pyrene and naphthalene will have increased stability compared to the biphenyl/terphenyl/tetraphenyl series. Additional stability may result from heterocyclic structures (containing units such as pyridine, pyrimidine, and thiophene) that provide, for example, additional mechanisms for controlling radical species and delaying the onset of decomposition chain reactions.

In an embodiment, the high-temperature component H comprises one or more compound(s) selected from the terphenyls (individually and in mixtures). In some embodiments, component H may comprise one or more compounds of the polynuclear aromatic compounds, such as: naphthalene, anthracene, phenanthrene, triphenylene, pyrene, perylene, coronene, and several benzopyrenes, and mixtures thereof. In another embodiment, component H comprises one or more compound(s) selected from heterocyclic compounds. Furthermore, component H may comprise one or more compound(s) with high temperature stability, such as one or more compound(s) selected from families of compounds that may not be suitable as single-component heat transfer fluids but provide desirable properties for component H in H/L mixtures, for example, desirable phase transition temperatures, desirable vapor pressure curves, thermal stability up to 500° C., and compatibility with component L. Additional properties that may be important for consideration of the one or more component H compound(s) include: viscosity at high and low temperature, heat capacity and thermal conductivity, toxicity and carcinogenicity, production capacity, cost, and potential for increased production at lower costs.

In an embodiment, the low temperature component L is selected for compatibility with the one or more component H compound(s) of the heat transfer fluid. In an embodiment, component H comprises one or more aromatic hydrocarbon(s) and component L comprises one or more compound(s) selected from: toluene, benzene, and mixtures thereof. Benzene has a lower molecular weight, thus a heat transfer fluid comprising benzene as component L would need smaller quantities for a given freezing point depression. However, toluene has a lower toxicity and carcinogenicity, and may be preferred in some embodiments in which safety is an issue. Benzene may be more compatible with polynuclear aromatic compounds, and thus may provide further benefits in heat transfer systems having adequate safety precautions to allow use of PNA/benzene mixtures.

Both toluene and benzene have low molecular weights (92 and 78 amu) compared to the component H candidates, so large mole-fraction effects are obtained at moderately low mass fractions of component L. Further, benzene and toluene are reported to be stable to above 600° C. and to above 565° C., respectively (Johns et al., 1962). Both are very stable, as demonstrated by the high temperatures needed for the hydrodealkylation (HDA) reaction used to convert toluene to benzene (99% selectivity) and low levels of diphenyl and higher oligomers (1% selectivity). The HDA reaction is conducted at 20 atm hydrogen pressure and 800° C. without catalysts or at 600° C. with catalysts, illustrating the low propensity of toluene to react. Indeed, provided the hydrogen activity is kept low, it is anticipated that both benzene and toluene trace compositions will be unreactive at the maximum service temperatures (up to 500° C., and possibly up to 600° C.) proposed for H/L mixtures.

In an embodiment, the heat transfer fluid further comprises one or more nanoparticle additive(s) in addition to component H and component L. At elevated temperatures the viscosity and heat capacity of heat transfer fluids may decrease and become sub-optimal. Nanoparticles are known to increase the viscosity of simple solvents, with a polynomial dependence on volume fraction. Nanoparticles also are known to be used to increase the heat capacity of a nanocomposite solution simply as a result of their intrinsically higher heat capacity. In an embodiment, a heat transfer fluid of the present invention comprising nanoparticles has a varying composition such that as the temperature rises and the system undergoes a phase change, component L is removed and the remaining mixture becomes more concentrated in nanoparticles, thereby leading to a larger viscosity and a larger heat capacity precisely when needed, i.e. at the elevated temperatures at which the thermophysical and transport properties of traditional fluids deteriorate. The nanoparticles not only serve to improve viscosity and heat capacity, but they may also have catalytic attributes that will lend a self-healing nature to the heat transfer fluid. For example, the nanoparticle surfaces may be designed to provide sites for scavenging radicals and preventing radical chain decomposition reactions, and/or they may provide active sites suitable for recombination of decomposition fragments. Exemplary nanoparticles include alumina nanoparticles and silica nanoparticles, which have desirable chemistry and also serve as supports for chromia or molybdena catalytic moieties. Additionally, depending on the pathways for specific H/L components, nanoparticles may be selected for other catalytic functionalities. Such particles can be functionalized as needed to provide optimal dispersion within the heat transfer fluids of the compositions outlined above. The properties of the nano-fluids are characterized, as a function of composition, nanoparticle size, and concentration.

The usefulness of a particular mixture is based on single- (and/or multi) component H and L phase transition temperatures, solubility information, and/or phase diagram predictions based on simple mixture models. Promising combinations are then forwarded to Item 2 below for refinement, and are examined in more detail for thermal stability. Regarding thermal stability, the Johns et al. work specifies the decomposition temperature as that where the species decomposition rate is 1 mole %/hr. This is clearly higher than the maximum service temperature for a fluid to be used in a solar power plant for several years. Therefore, experimental observation of decomposition reactions includes detection of reaction products as well as quantification of decomposition rates. Decomposition studies are conducted in several Parr high-pressure batch reactors, operating at high temperature for hours or days. Gas chromatograph analysis of vapor products and high performance liquid chromatography analysis of condensed-phase decomposition products provide information on both decomposition kinetics and pathways. Thus, the consequences of decomposition are determined to distinguish between potential compounds producing hydrogen (embrittling steel) and other decomposition pathways producing products that are readily removed in the diurnal cycle or even recycled back into the desired H or L components. Further, understanding of the decomposition mechanisms of otherwise promising advanced heat transfer fluid components provides for identification of additives similar to the free radical scavengers added to motor oils as anti-oxidants, or to desirable functionalization of nanoparticles to extend fluid stability.

Parabolic Trough Systems

The variable composition high temperature heat transfer fluid mixture of the present invention may be utilized as the working fluid in parabolic trough systems and can provide performance advantages. The major performance advantage arises from increased efficiency of the power block equipment when operated at temperatures above the current limitation of 390-400° C. Raising the maximum temperature of the heat transfer fluid to 500° C. may increase the system performance by as much as 10%. However, thermal losses from the collector tubes and associated piping will increase at higher temperatures, reducing some of the benefit of operation at higher temperatures. The pumping costs for the present fluid system are uncertain at this time, but they may be higher than for the Therminol fluid. The variable composition heat transfer fluid also requires flashing of the low freezing point component, component L, with subsequent condensation. In an embodiment, the condensation energy may be recovered for use elsewhere in the plant to avoid reduced system performance.

Models for the components in fixed composition parabolic trough systems have been developed. However, no present models exist for the variable composition heat transfer fluid system, necessitating the development of these models by incorporating existing property data with models for the flash tank and condenser to simulate the variable composition system over a range of operating conditions. The models are applied in simulations that investigate the extent of flashing required for operation at temperatures as high as 500° C. In a parabolic trough system, it may be advantageous to flash the mixture and reintroduce the low freezing point component at multiple locations.

Storage

In an embodiment, the present variable composition heat transfer fluid and system may operate at higher temperatures, thereby reducing the volume and thus the expense of a thermal energy storage unit and providing greater storage efficiency by allowing a larger temperature range for the thermocline. The economics of both parabolic trough and central receiver systems can benefit significantly by the addition of thermal storage since the peak electrical demand typically extends beyond the period of available solar radiation by a period ranging from 2 to 6 hours. In addition, the use of circulating the heat transfer fluid during periods of no sun to reduce the possibility of solidification of the working fluid necessitates some energy storage. Models of both packed bed and liquid storage units with stratification exist in TRNSYS. The packed bed model has recently been compared with experimental data from Solar One (McMahan, 2006) and found to accurately represent these data. Both single and dual tanks have been proposed and each offers advantages. The proposed variable composition fluids may provide operating and heat storage performance benefits in single and dual tank storage, and how the quantity of thermal storage may affect the desired variable-composition control strategy.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A heat transfer system comprising:
   a heat transfer fluid comprising a high boiling point component and a low freezing point component provided as a miscible mixture, wherein said high boiling point component and said low freezing point component each comprise one or more organic compounds, wherein said high boiling point component has a boiling point temperature greater than or equal to 500° C. at a pressure of 5 atmospheres, and wherein said low freezing point component has a freezing point temperature less than or equal to 80° C.;
   a vessel for containing said heat transfer fluid;
   a heat source for heating said heat transfer fluid contained in said vessel;
   an outlet for removing at least a portion of said low freezing point component from said heat transfer fluid upon increasing temperature of said heat transfer fluid, wherein said low freezing point component is removed as a gas, thus allowing generation of removed low freezing point component;
   an inlet for adding at least a portion of said removed low freezing point component to said heat transfer fluid upon decreasing temperature of said heat transfer fluid, thereby maintaining said heat transfer fluid in a liquid state; and
   a condenser in fluid communication with said outlet and inlet for condensing said low freezing point component, thus generating removed liquid phase low freezing point component, wherein said inlet returns at least a portion of said removed liquid phase low freezing point component to said heat transfer fluid upon decreasing temperature of said heat transfer fluid.

2. The system of claim 1, wherein said heat transfer fluid has a variable mass fraction of said high boiling point component, low freezing point component or both.

3. The system of claim 2, wherein the mass fraction of said high boiling point component increases upon increasing the temperature of said heat transfer fluid when the heat transfer fluid reaches a temperature equal to or greater than the boiling point of said low freezing point component.

4. The system of claim 3, wherein the mass fraction of said high boiling point component varies from 50% to 99% over a temperature range of 20° C. to 500° C.

5. The system of claim 2, wherein the mass fraction of said high boiling point component decreases when the heat transfer fluid reaches a temperature equal to or less than the boiling point temperature of said low freezing point component.

6. The system of claim 5, wherein the mass fraction of said high boiling point component varies from 99% to 50% over a temperature range of 500° C. to 20° C.

7. The system of claim 1, wherein said outlet is a pressure sensitive valve.

8. The system of claim 7, wherein said pressure sensitive valve opens and removes at least a portion of said low freezing point component from said heat transfer fluid when the vapor pressure of the heat transfer fluid reaches a preselected pressure selected over the range of 1 atmosphere to 20 atmospheres.

9. The system of claim 7, wherein said pressure sensitive valve opens and removes at least a portion of said low freezing point component from said heat transfer fluid when the vapor pressure of the heat transfer fluid reaches a preselected pressure greater than or equal to 1 atmosphere.

10. The system of claim 1, wherein said outlet is a temperature sensitive valve.

11. The system of claim 10, wherein said temperature sensitive valve opens and removes at least a portion of said low freezing point component from said heat transfer fluid when the heat transfer fluid reaches a preselected temperature selected over the range of 100° C. to 500° C.

12. The system of claim 10, wherein said temperature sensitive valve opens and removes at least a portion of said low freezing point component from said heat transfer fluid when the heat transfer fluid reaches a temperature greater than or equal to 100° C.

13. The system of claim 10, wherein said temperature sensitive valve opens and removes at least a portion of said low freezing point component from said heat transfer fluid when the temperature of the heat transfer fluid reaches a temperature at which the low freezing point component boils.

14. The system of claim 1, wherein said inlet is a pressure activated valve.

15. The system of claim 14, wherein said pressure activated valve is activated to open and add at least a portion of said removed low freezing point component to said heat transfer fluid when the vapor pressure of the heat transfer fluid falls below 1 atmosphere.

16. The system of claim 14, wherein said pressure activated valve is activated to open and add at least a portion of said removed low freezing point component to said heat transfer fluid when the vapor pressure of the heat transfer reaches a preselected pressure selected over the range of 1 to 20 atmospheres.

17. The system of claim 1, wherein said inlet is a temperature activated valve.

18. The system of claim 17, wherein said temperature activated valve is activated to open and add at least a portion of said removed low freezing point component to said heat transfer fluid when the heat transfer fluid reaches a preselected temperature selected over the range of 100° C. to 300° C.

19. The system of claim 17 wherein said temperature activated valve is activated to open and add at least a portion of said removed low freezing point component to said heat transfer fluid when the heat transfer fluid reaches a temperature less than or equal to 100° C.

20. The system of claim 17, wherein said temperature activated valve is activated to open and add at least a portion of said removed low freezing point component to said heat transfer fluid when the temperature of said heat transfer fluid is equal to or below a temperature of the heat transfer fluid at which the low freezing point component boils.

21. The system of any of claims 1 and 2-20, wherein said heat transfer fluid remains in the liquid state within a temperature range of 0° C. to 500° C.

22. The system of claim 1, wherein said heat transfer fluid has a freezing point temperature less than 80° C.

23. The system of claim 1, wherein said heat transfer fluid has a heat capacity selected over the range of 2-5 J/(g K) for temperatures up to 500° C.

24. The system of claim 1, wherein said low freezing point component has a freezing point temperature less than or equal to 20° C.

25. The system of claim 1, wherein said low freezing point component has a freezing point temperature selected over the range of 5° C. to 80° C.

26. The system of claim 1, wherein said high boiling point component is thermally stable at 500° C.

27. The system of claim 1, wherein said high boiling point component comprises one or more organic compounds selected from the group consisting of poly-phenyl compounds, polynuclear aromatic compounds, heterocyclic compounds, substituted aromatic compounds, perfluorinated ring compounds, and aromatic silanes.

28. The system of claim 1, wherein said high boiling point component comprises one or more polynuclear aromatic compounds selected from the group consisting of substituted or unsubstituted diphenyl oxide, biphenyl, o-terphenyl, m-terphenyl, p-terphenyl, anthracene, phenanthrene, pyrene, triphenylene, chrysene, perylene, coronene, and benzopyrene.

29. The system of claim 1, wherein said low freezing point component comprises one or more organic compounds selected from the group consisting of poly-phenyl compounds, polynuclear aromatic compounds, heterocyclic compounds, substituted aromatic compounds, perfluorinated ring compounds, and aromatic silanes.

30. The system of claim 1, wherein said low freezing point component comprises one or more polynuclear aromatic compounds selected from the group consisting of substituted or unsubstituted benzene, toluene, diphenyl oxide, biphenyl o-terphenyl, m-terphenyl, and naphthalene.

31. The system of claim 1, wherein said high boiling point component comprises m-terphenyl and said low freezing point component comprises toluene.

32. The system of claim 1, wherein said high boiling point component comprises pyrene and said low freezing point component comprises benzene.

33. The system of claim 1, further comprising a storage tank in fluid communication with said inlet and said outlet for storing said removed low freezing point component.

34. The system of claim 1, further comprising an access valve means for removing volatile impurities from said removed low freezing point component, wherein said access valve means for removing volatile impurities is in fluid communication with said outlet.

35. The system of claim 1, wherein said vessel exchanges heat from said heat transfer fluid to a thermal reservoir.

36. The system of claim 35, wherein said thermal reservoir is a steam generator configured to drive a turbine.

37. The system of claim 1, wherein said heat source is a solar heat source.

38. A heat transfer method comprising the steps of:
providing a heat exchange vessel;
providing a heat transfer fluid contained in said vessel, wherein the heat transfer fluid comprises a high boiling point component and a low freezing point component provided as a miscible mixture, wherein said high boiling point component and said low freezing point component each comprise one or more organic compounds, wherein said high boiling point component has a boiling point temperature greater than or equal to 500° C. at a pressure of 5 atmospheres, and wherein said low freezing point component has a freezing point temperature less than or equal to 80° C.;
heating said heat transfer fluid;
removing at least a portion of said low freezing point component as a gas from said heat transfer fluid upon increasing temperature of said heat transfer fluid, thus generating removed low freezing point component; and
condensing said removed low freezing point component into a liquid state, thus generating removed liquid phase low freezing point component; and
adding at least a portion of said removed low freezing point component to said heat transfer fluid upon decreasing temperature of said heat transfer fluid, thereby maintaining said heat transfer fluid in a liquid state, wherein said adding step comprises returning at least a portion of said removed liquid phase low freezing point component to said heat transfer fluid.

39. The method of claim 38, wherein said step of removing at least a portion of said low freezing point component increases the boiling point temperature of said heat transfer fluid.

40. The method of claim 38, wherein said step of adding at least a portion of said low freezing point component liquid decreases the freezing point temperature of said heat transfer fluid.

41. The method of claim 38, wherein said step of adding at least a portion of said low freezing point component liquid decreases the freezing point temperature of said heat transfer fluid to a temperature equal to or less than 20° C.

42. The method of claim 38, wherein said adding and removing steps vary the mass fraction of said high boiling point component, said low freezing point component or both.

43. The method of claim 42, wherein said mass fraction of said high boiling point component varies from 50% to 99%.

44. The method of claim 42, wherein said removing step increases the mass fraction of said high boiling point component in said heat transfer fluid.

45. The method of claim 42, wherein said adding step decreases the mass fraction of said high boiling point component in said heat transfer fluid.

46. The method of claim 38, wherein said removing step is carried out at a vapor pressure of said heat transfer fluid selected over the range of 1 to 20 atmospheres.

47. The method of claim 38, wherein said removing step is carried out at a temperature of said heat transfer fluid selected over the range of 100° C. to 500° C.

48. The method of claim 38, wherein said adding and/or removing steps maintain said heat transfer fluid in a liquid state within a temperature range from 0° C. to 500° C.

49. The method of claim 38, wherein said heating step comprises solar heating of said heat transfer fluid.

50. The method of claim 38, further comprising the step of exchanging heat from said heat transfer fluid to a thermal reservoir, wherein said thermal reservoir is a steam generator configured to drive a turbine.

* * * * *